(12) United States Patent
Taylor

(10) Patent No.: US 6,601,609 B2
(45) Date of Patent: Aug. 5, 2003

(54) FLUID FLOW CONTROL VALVE

(76) Inventor: Shane S. Taylor, 4180 S. Inca St., Englewood, CO (US) 80110

( * ) Notice: Subject to any disclaimer, the term of this patent is extended or adjusted under 35 U.S.C. 154(b) by 0 days.

(21) Appl. No.: 09/872,130

(22) Filed: Jun. 1, 2001

(65) Prior Publication Data

US 2002/0179154 A1 Dec. 5, 2002

(51) Int. Cl.[7] .................................................. A62B 9/02
(52) U.S. Cl. ........................ 137/614.2; 128/202.27; 128/205.22; 128/205.24
(58) Field of Search ........................ 137/536, 538, 137/539, 540, 549, 550, 614.2; 128/202.27, 205.22, 205.24

(56) References Cited

U.S. PATENT DOCUMENTS

| | | | | |
|---|---|---|---|---|
| 391,431 A | * | 10/1888 | Shoff | 137/538 |
| 868,022 A | * | 10/1907 | Shafer | 137/550 |
| 2,053,931 A | * | 9/1936 | Work | 137/614.2 |
| 3,045,688 A | * | 7/1962 | Fay | 137/614.2 |
| 4,226,257 A | | 10/1980 | Trinkwalder | |
| 5,183,075 A | * | 2/1993 | Stein | 137/539 |
| 5,526,843 A | * | 6/1996 | Wolf et al. | 137/550 |
| 5,685,297 A | | 11/1997 | Schuler | |
| 5,687,712 A | | 11/1997 | Semeia | |

* cited by examiner

Primary Examiner—John Rivell
(74) Attorney, Agent, or Firm—Knobbe Martens Olson & Bear, LLP

(57) ABSTRACT

A fluid flow control valve is disclosed. This valve includes a housing which defines a central passageway having fluid inlet and fluid outlet openings. A pressure responsive element is disposed within the passageway for selectively opening and closing the inlet opening to fluid flow in response to fluid pressure exerted thereon at the inlet opening. A mechanism is provided within the passageway for exerting a bias force against the pressure responsive element which is sufficient to close the inlet opening to fluid flow absent a pre-established level of fluid pressure exerted on the pressure responsive element. A fluid filter element is also disposed within the passageway; and a retainer device is positioned for removably securing the filter element within the passageway.

48 Claims, 17 Drawing Sheets

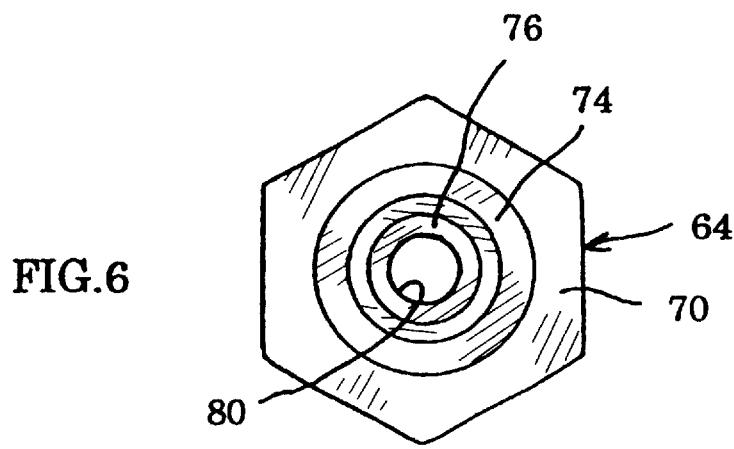
FIG.6
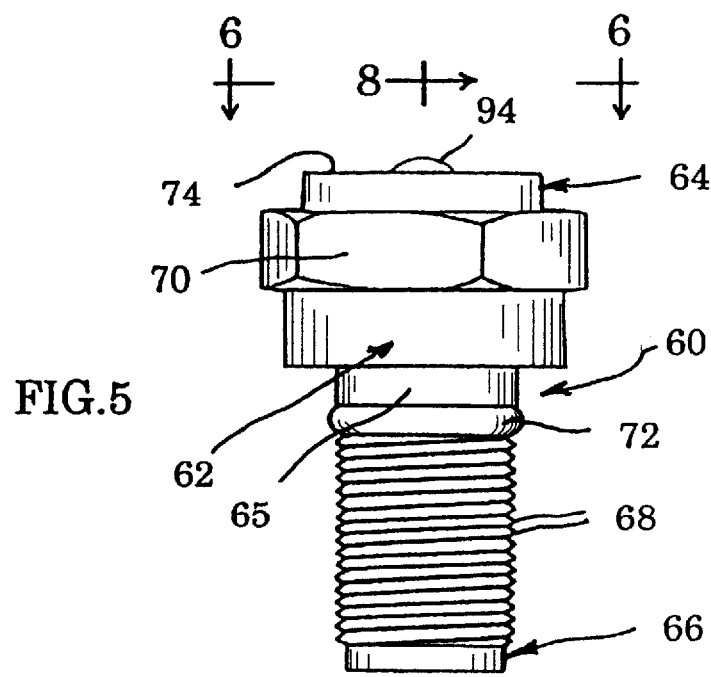
FIG.5
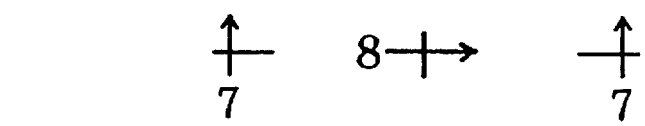
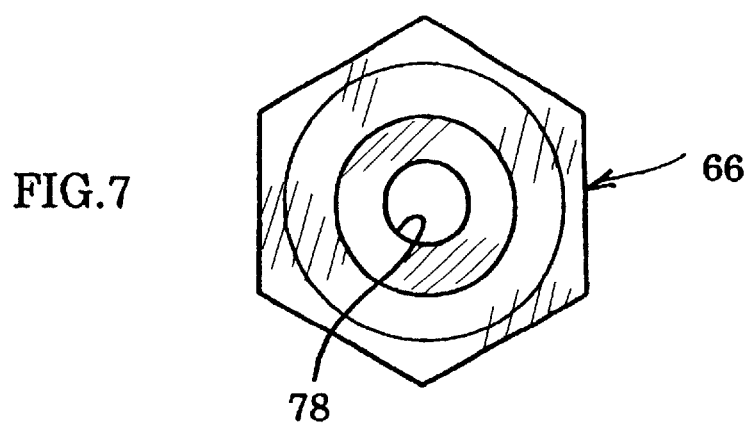
FIG.7

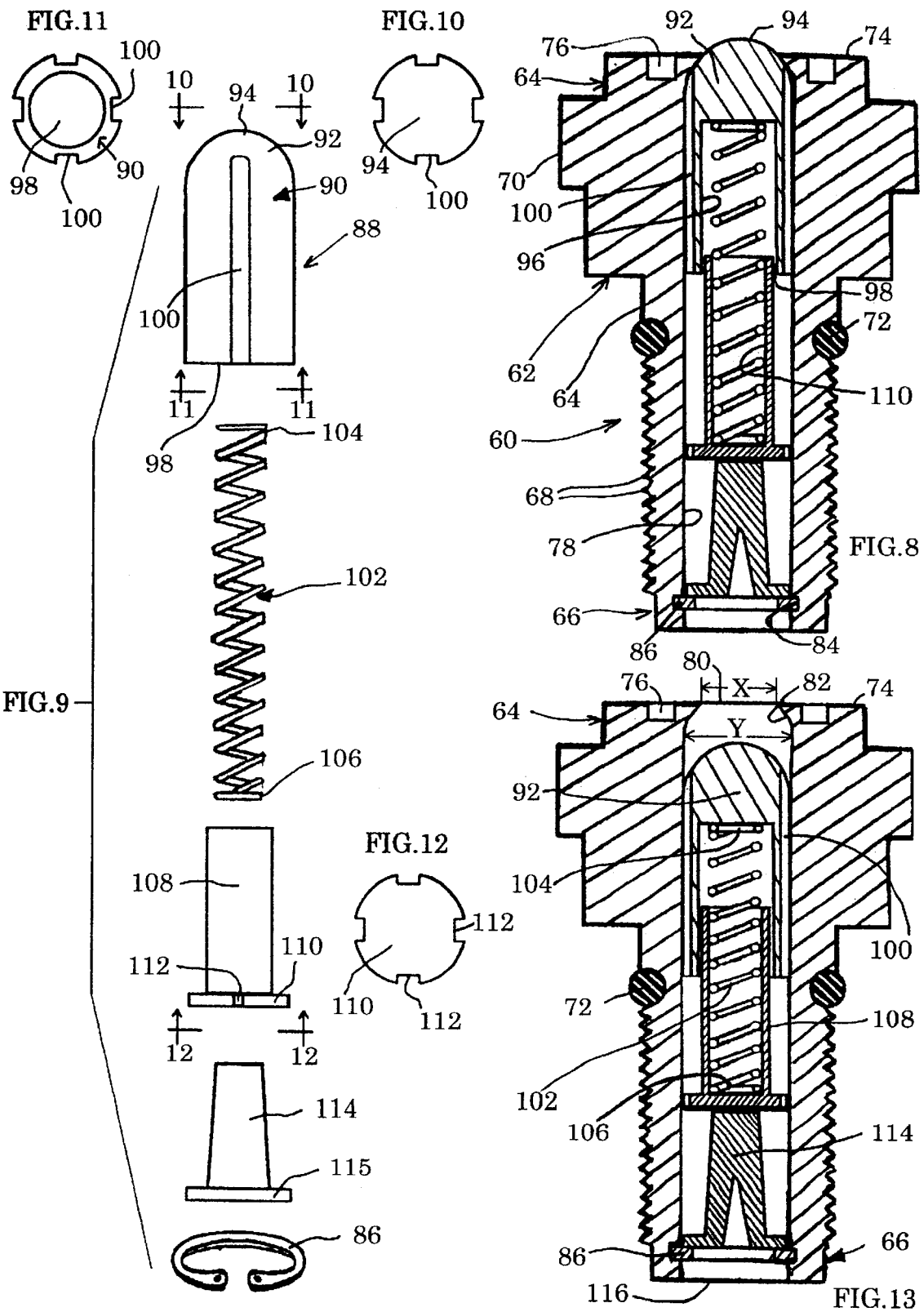

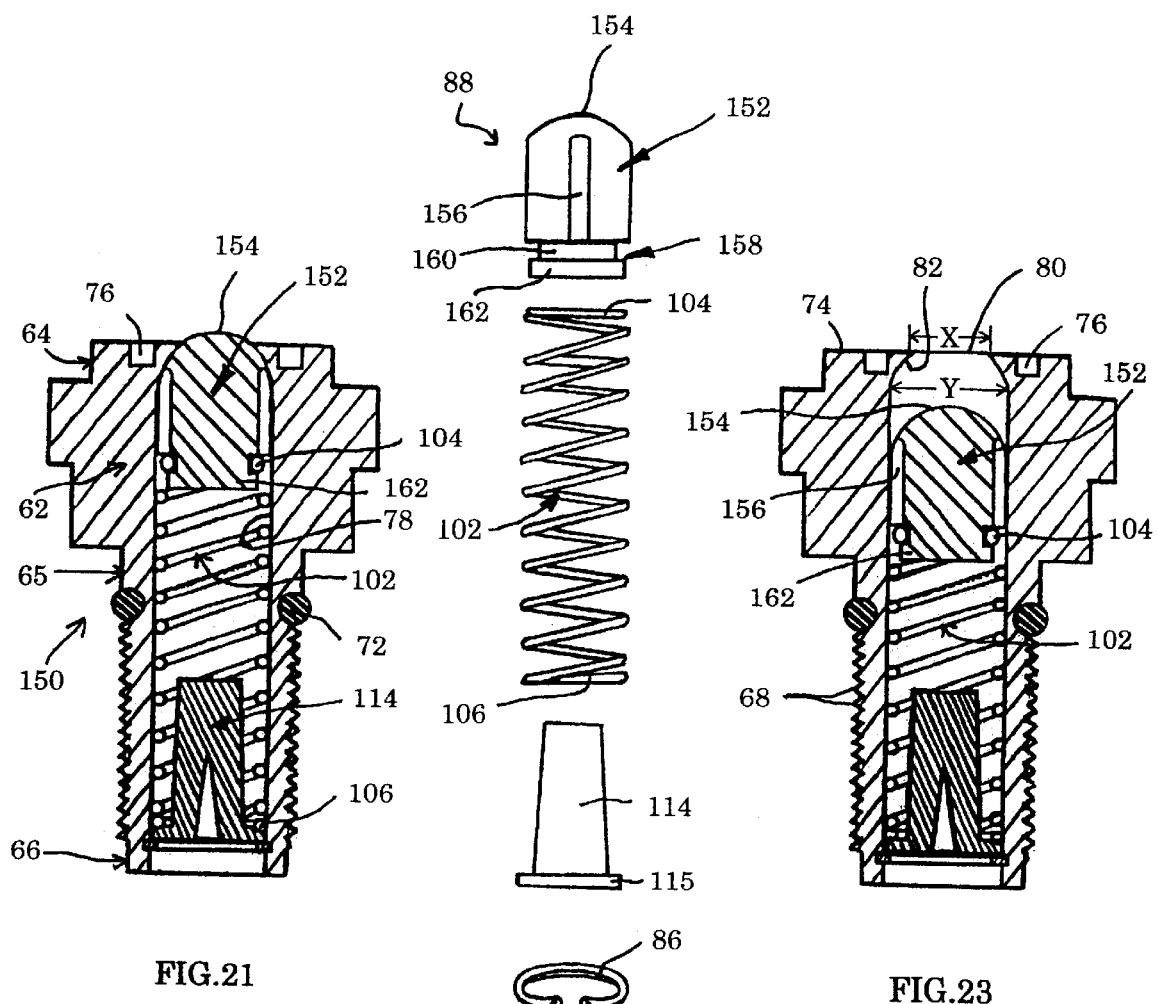

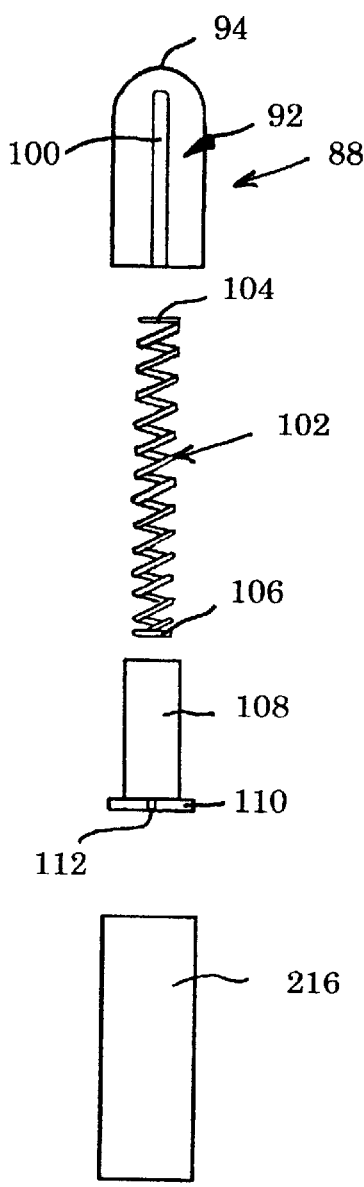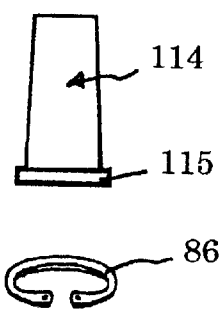
FIG.31
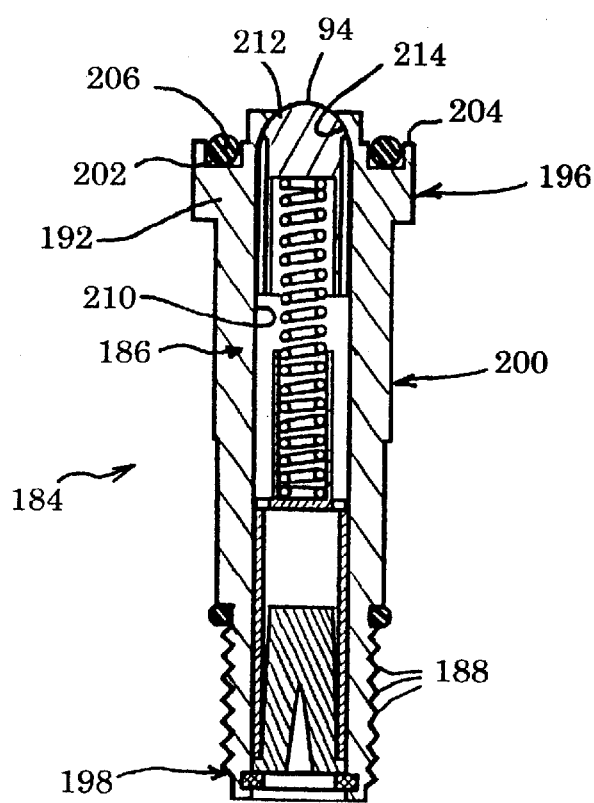
FIG.30

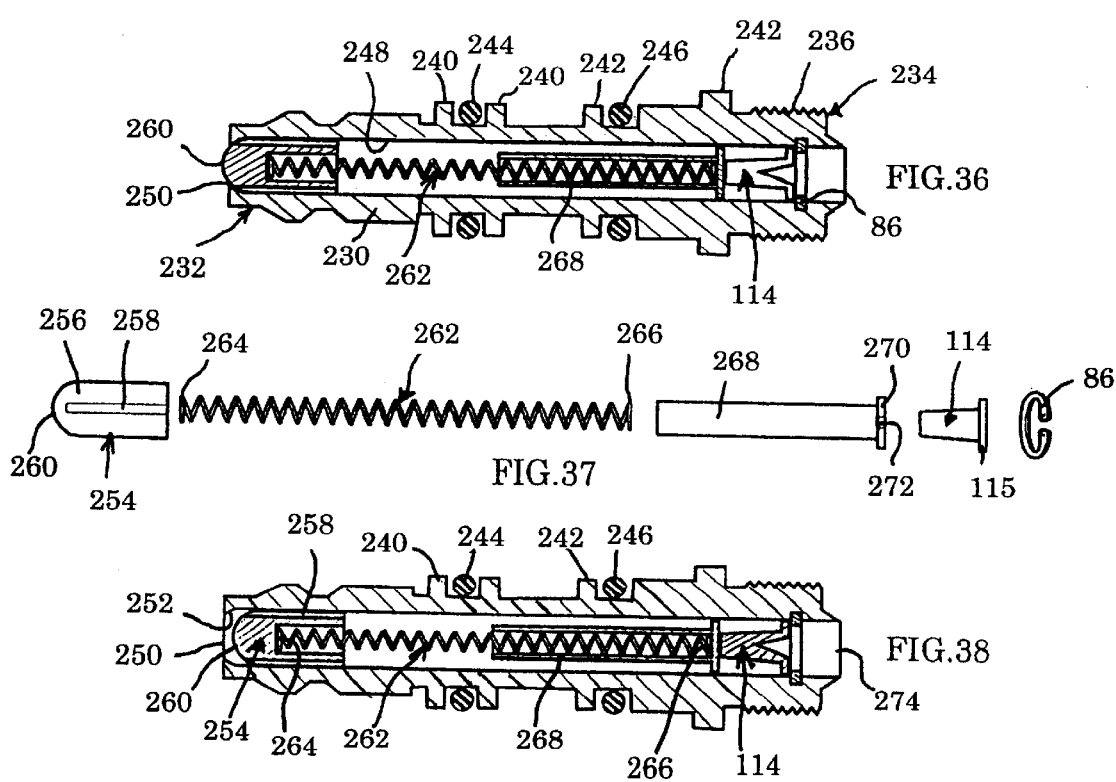

FLUID FLOW CONTROL VALVE

BACKGROUND OF THE INVENTION

1. Field of the Invention

The present invention relates generally to fluid flow control and regulation devices and, more particularly, to one-way flow control devices and valves for pressurized fluids, especially gas. Specifically, the present invention relates to such flow control devices particularly adaptable as inlet valves for first and second stage regulator members used in scuba diving units to prevent the entry of water and other contaminates into the regulator member without interfering with the proper flow of breathable gas.

2. Description of the Prior Art

Fluid flow regulator and control devices of various types are well known in the art. Both liquid and gas regulator devices have been adapted for a wide variety of commercial and industrial assemblies and apparatus. However, the adaptation of such devices to high-pressure environments having relatively small fluid control apertures and valves is highly specialized. This is particularly true in the field of scuba (self-contained underwater breathing apparatus) diving equipment and regulators.

Within the past several decades, the sport of scuba diving has enjoyed considerable popularity so that there exists an entire industry for supplying equipment for the sport. Moreover, the popularity of the sport continues to increase dramatically. This industry manufactures and sells a wide variety of instruments, devices and equipment to enable a person to properly breathe underwater and remain beneath the water's surface for extended periods of time. One of the most vital concerns in the manufacture of underwater breathing apparatus is the need for a source of air or other breathable gas mixtures at substantially constant pressure. That is, in order to allow a person to breathe properly, it is necessary to have a source of air or other breathable gas, the pressure of which does not fluctuate randomly at the point of intake.

Typically, scuba divers utilize a pressurized source of breathable gas, such as compressed air as well as mixed gas blends, at a relatively high initial pressure which may exceed 3,000 psi and even reach 4500–5000 psi in certain technical diving situations. Pressure regulators have been developed over the years to deliver such breathable gas to a diver at ambient pressure regardless of the depth of the scuba diver. Consequently, the breathable gas is typically reduced in pressure in staged steps. The first step is performed by a first stage regulator member of a dual stage regulator assembly which reduces the tank pressure of approximately 3,000 psi or greater to a constant intermediate pressure of about 120–140 psi. The first stage regulator is mounted directly to the high pressure source of gas, such as a scuba tank outlet valve, and the intermediate pressure gas is then directed through a pressure hose exiting the first stage regulator member.

The intermediate pressure gas from the pressure hose is then delivered to a second stage regulator member which generally has a diaphragm arrangement to further reduce gas pressure and provide breathable gas to the diver at a usable, that is ambient, pressure. The second stage regulator member may be in the form of a primary regulator utilized by the scuba diver as a primary source of breathing gas, or it may be in the form of what is commonly called an alternate gas or air source, or an octopus. The alternate air source is utilized for emergency breathing situations and is frequently combined with an inflator valve for use with buoyancy control devices. Moreover, intermediate gas pressure lines or hoses may also extend from the first stage regulator member to provide gas for other purposes, such as use with a dry exposure suit and the like.

Once the dual stage regulator assembly is attached to a scuba tank gas outlet valve to create an entire scuba unit, the scuba unit is an environmentally closed or sealed system. In other words, the system wherein compressed gas passes from the tank through the first stage regulator, the intermediate pressure hoses and to the inner side of the second stage regulator member diaphragm, is limited only to compressed gas and is not exposed to the environment in any manner. The exterior or outer side of the second stage regulator member diaphragm, however, is exposed to the ambient environment, including water. It is essential, then, that the regulator assembly gas delivery system remain dry both during its use when connected to a scuba tank as well as when it is not being used and is disconnected from a scuba tank. Otherwise, contaminants, such as salt water, fresh water, wash water, airborne particulates and the like, will contaminate the assembly if allowed to enter the interior of the regulator assembly, such as at the gas inlet opening. Such contamination can include the rusting and corrosion of internal metal air filters and other internal parts of the regulator assembly as well as possibly clogging small apertures or orifices and thus preventing the regulator assembly from operating properly if even at all.

While it is simple to observe how a regulator assembly can remain dry when fully installed to a scuba tank and in use, a problem occurs once the regulator assembly is disconnected from a tank after a dive is over. As previously mentioned, the gas in the tank is delivered to the first stage regulator member through a tank outlet valve. There are two basic and most common types of valve connection arrangements between a scuba tank and the first stage regulator member which are standard in the art. However, other less common connection arrangements are also available, such as those utilized in technical diving and rebreather units. The first typical connection is the most common and is known as a yoke connection wherein the first stage regulator member has a round opening plugged by a metal filter surrounded by a raised collar with an O-ring thereabout. In this arrangement, the tank outlet valve has a small aperture at the middle of a round recessed area, the raised collar snugly fitting within the recessed area so that the O-ring is fitted against it. A yoke fitting is secured to the first stage regulator member and surrounds the tank outlet valve and a hand knob is hand tightened against the back of the tank valve to force the raised collar against the round recessed area so that the O-ring is snugly compressed therebetween. The second common connection arrangement is called a DIN valve connection wherein the first stage regulator member simply screws directly into the tank valve outlet opening using five or seven threads depending upon the pressure to be contained within the tank.

Heretofore, a dust and water cap has generally been used as standard equipment for covering the opening of an air pressure inlet valve of the first-stage regulator member when the regulator is not in use. The dust cover is typically either plastic or rubber and is held in place by the yoke and hand knob. Moreover, the valve connection of the DIN valve arrangement as well as the alternate air source for the intermediate pressure hose also generally have removable caps which cover the inlet opening when not in use. When a scuba diver completes his or her diving, the gas cylinder valve is released from the regulator inlet valve. At this time, ideally the dust and water cap is attached to the top of the air inlet valve to prevent water and contaminates such as described above from entering the air inlet valve and contaminating, rusting and/or corroding the internal air filter and other internal parts inside the valve. Unfortunately, as can be imaged, divers often forget to install the dust cap on the air inlet valve and/or the cap on the alternate air regulator member inlet, and the internal regulator filter then becomes contaminated when the scuba equipment is washed down after a dive or later when the valve is exposed to outdoor elements. This is particularly true of new or student divers. The contamination can cause a gas restriction inside the regulator assembly and a potential breathing hazard to the diver. Also, the gas restriction can cause the high pressure gas to break apart portions of the air filter, which can cause internal damage and failure of working parts inside the regulator assembly. Further, water entering the regulator assembly at either the first or second stage regulator members can cause internal rusting and corrosion of the working parts and failure of the regulator. While significant technical advances have been made over the years since the advent of the scuba diving system, this problem of preventing inadvertent or negligent contamination of the regulator system has never been satisfactorily addressed. In almost 60 years of scuba diving equipment development, a dust cover manually put into place by the diver is the best that has been achieved to date.

U.S. Pat. Nos. 4,226,257, 5,685,297 and 5,687,712 all disclose scuba diving regulator assemblies and valves therein, but none address the problem discussed above nor are they directed to regulator inlet valve construction in any particular manner. Consequently, there remains a significant need in general and more specifically in the diving industry, for a fluid, and in particular breathable gas, control system that will allow gas to flow into regulator members as required yet prevent any fluid or particulate contaminants from passing into the regulator inlet valves inadvertently without requiring one to remember to physically place a cover or cap over the inlet valve when not in use. The present invention addresses this significant problem in fluid flow systems in general and more particularly in the use of breathable gas regulators for scuba diving systems, oxygen delivery systems, emergency breathing systems and the like.

SUMMARY OF THE INVENTION

Accordingly, it is one object of the present invention to provide an improved fluid flow regulation device.

It is another object of the present invention to provide a one-way control valve arrangement wherein fluid may flow through the valve only at preset pressures.

Yet another object of the present invention is to provide a valve arrangement for use with compressed gas wherein the valve prevents entry of any fluid or other particulate matter yet enables easy flow of pressurized gas therethrough.

Still another object of the present invention is to provide an inlet valve construction for use in scuba regulator assemblies which allows the free flow of gas to the diver yet prevents the entry of water or other fluid as well as airborne contaminates.

A further object of the present invention is to provide an inlet valve assembly for use in both first and second stage members of scuba regulator assemblies which eliminates the need for separate cover elements to prevent the entry of water or other fluid as well as airborne contaminates into the regulator assembly.

To achieve the foregoing and other objects and in accordance with the purpose of the present invention, as embodied and broadly described herein, a fluid flow control valve is disclosed. This valve includes a housing which defines a central passageway having fluid inlet and fluid outlet openings. A pressure responsive element is disposed within the passageway for selectively opening and closing of the inlet opening to fluid flow in response to fluid pressure exerted thereon at the inlet opening. A mechanism is provided within the passageway for exerting a bias force against the pressure responsive element which is sufficient to close the inlet opening to fluid flow absent a pre-established level of fluid pressure exerted on the pressure responsive element. A fluid filter element is also disposed within the passageway; and a retainer device is positioned for removably securing the filter element within the passageway.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 4 is a top perspective view of the first stage regulator member of FIG. 1 connected to the gas outlet yoke-style connection valve of the standard scuba tank of FIG. 3;

FIG. 5 is a side plan view of one yoke-style inlet valve embodiment as constructed in accordance with the present invention;

FIG. 6 is a top plan view taken substantially along line 6—6 of FIG. 5;

FIG. 7 is a bottom plan view taken substantially along line 7—7 of FIG. 5;

FIG. 8 is a cross-sectional view taken substantially along line 8—8 of FIG. 5 and illustrating the inlet valve embodiment in a closed position to prevent fluid flow therethrough;

FIG. 9 is an exploded plan view of the internal components of the inlet valve embodiment illustrated in cross-section in FIG. 8;

FIG. 10 is a top plan view of the pressure responsive element of FIG. 9 taken substantially along line 10—10 of FIG. 9;

FIG. 11 is a bottom plan view of the pressure responsive element of FIG. 9 taken substantially along line 11—11 of FIG. 9

FIG. 12 is a bottom plan view of the spring containment sleeve of FIG. 9 taken substantially along line 12—12 of FIG. 9;

FIG. 13 is a cross-sectional view substantially similar to FIG. 8 but illustrating the inlet valve embodiment in an open position to permit fluid flow therethrough;

FIG. 21 is a cross-sectional view illustrating a fourth yoke-style inlet valve embodiment constructed in accordance with the present invention and in a closed position to prevent fluid flow therethrough;

FIG. 22 is an exploded plan view of the internal components of the inlet valve embodiment illustrated in cross-section in FIG. 21;

FIG. 23 is a cross-sectional view substantially similar to FIG. 21 but illustrating this fourth inlet valve embodiment in an open position to permit fluid flow therethrough;

FIG. 30 is a cross-sectional view taken substantially along line 30—30 of FIG. 27 and illustrating this DIN-style inlet valve embodiment in a closed position to prevent fluid flow therethrough;

FIG. 31 is an exploded plan view of the internal components of the DIN-style inlet valve embodiment illustrated in cross-section in FIG. 30;

FIG. 36 is a cross-sectional view of a quick connect/disconnect junction as illustrated in FIG. 35 but modified to incorporate integrally therewith an inlet valve embodiment constructed in accordance with the present invention, the inlet valve embodiment being illustrated in a closed position to prevent the flow of fluid therethrough.

FIG. 37 is an exploded plan view of the internal components of the inlet valve embodiment illustrated in cross-section in FIG. 36;

FIG. 38 is a cross-sectional view substantially similar to FIG. 36 but illustrating this particular inlet valve embodiment in an open position to permit fluid flow therethrough;

FIG. 40 is a cross-sectional view of an inlet valve constructed in accordance with the present invention and modified to replace the standard inlet valve and yoke retainer of the first stage regulator component of FIG. 39;

DETAILED DESCRIPTION OF THE INVENTION

Figure 1:
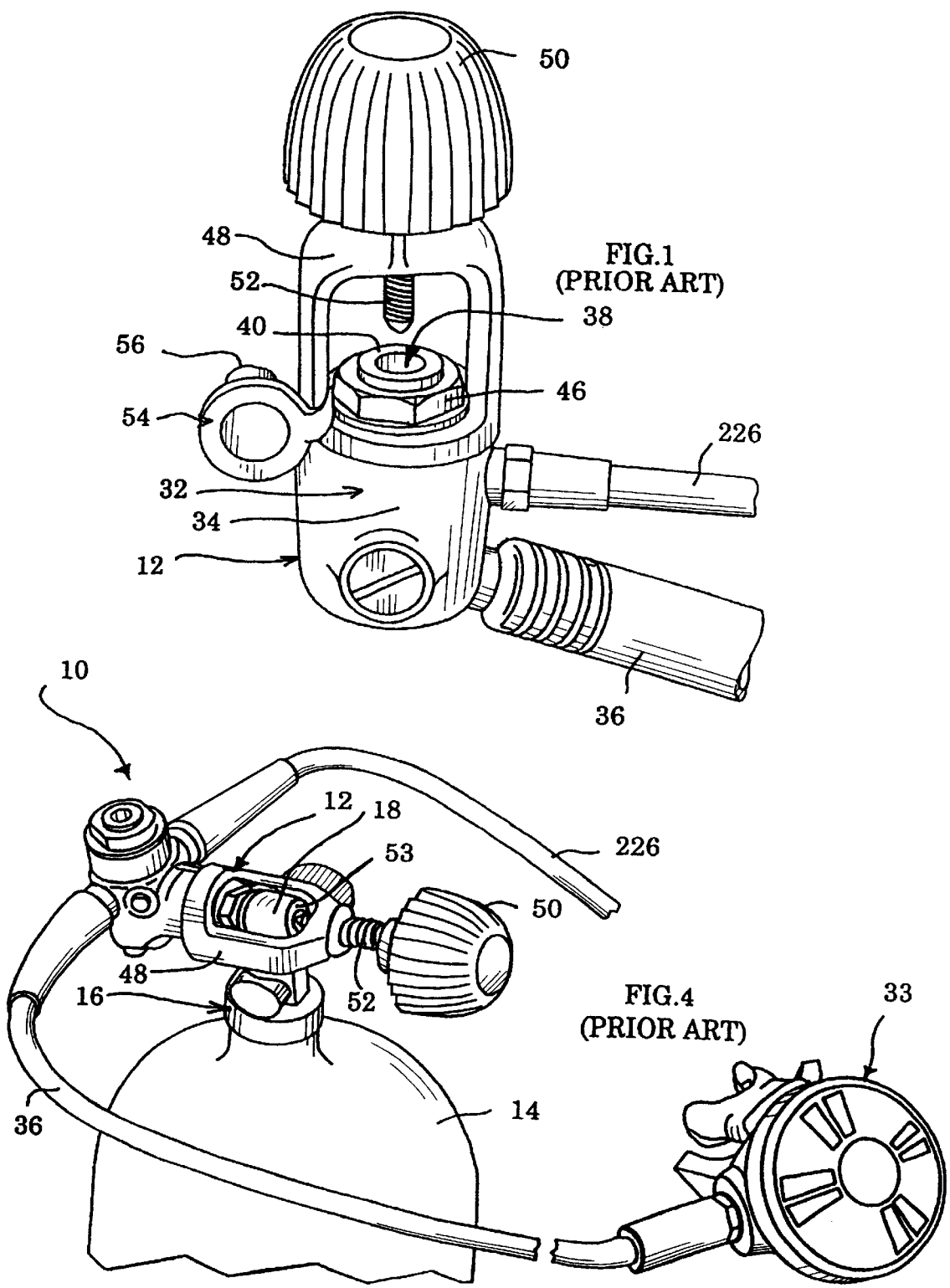
FIG. 1 is a perspective view of a typical first-stage regulator member of a yoke-style dual stage regulator assembly for a scuba diving unit incorporating a known prior art gas inlet valve arrangement.
Figure 2:
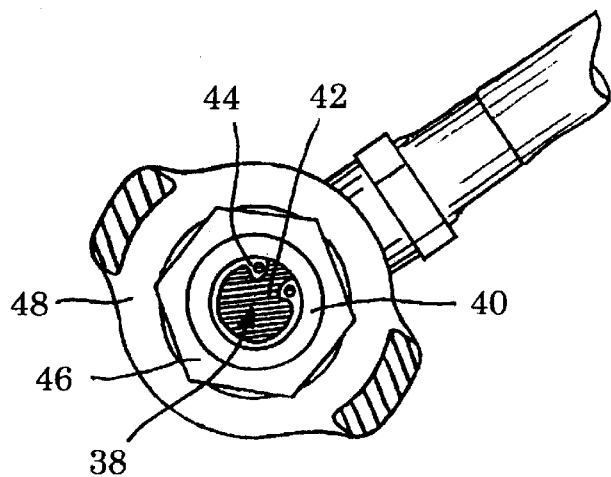
FIG. 2 is a front plan view of the inlet valve arrangement of FIG. 1 taken substantially along line 2—2 of FIG. 1.
Figure 3:
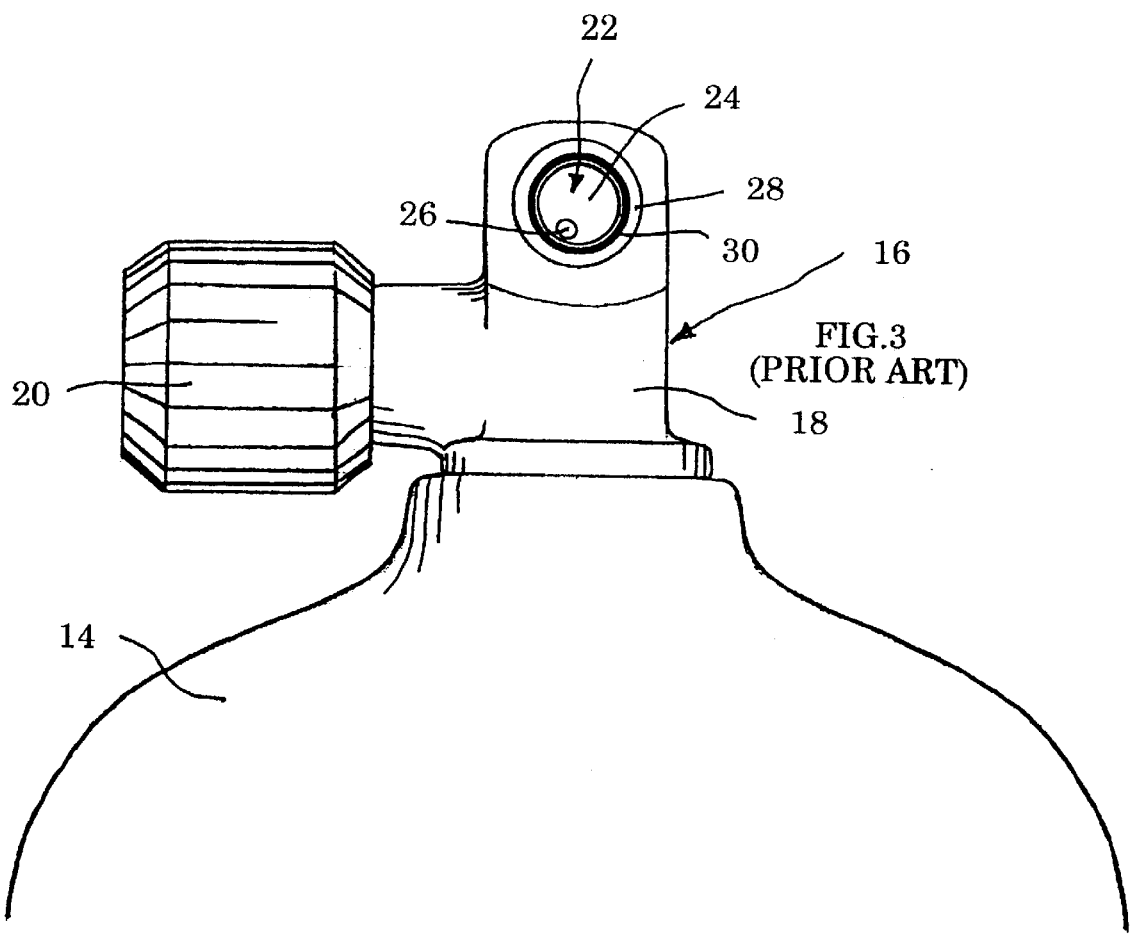
FIG. 3 is a front plan view of a typical gas outlet yoke-style connection valve of a standard scuba tank as is well known in the art.

The present invention is directed to a valve arrangement, both removable as well as integral, for controlling fluid flow in devices of various types. More particularly, the valve of the present invention is designed as an inlet valve to enable one-way fluid flow into a device while preventing undesirable materials from entering the device. The preferred embodiments of the invention which are illustrated in detail herein are particularly adapted for use in gas pressure regulators for scuba (self-contained underwater breathing apparatus) diving units. It should be understood, however, that the present invention may be utilized with or incorporated as a part of any type of device or apparatus wherein fluid in the form of liquid or gas must enter the device under pressure. Other such examples may include fire, rescue and air emergency breathing units as well as oxygen units.

Referring first to FIGS. 1–4, a scuba unit 10 of standard well-known design is illustrated having a regulator assembly 12 and a tank 14 for compressed breathable gas. Typically, the scuba tank 14 is a steel or aluminum cylinder designed to contain compressed gas at substantial pressures, i.e. well over 3000 psi. The most preferred breathable gas is simply compressed air. However, a variety of gas mixtures, such as nitrogen/oxygen blends commonly referred to as Nitrox as well as other gas blends which may include various other inert gases, are becoming more commonly used by the recreational scuba diver. It should be understood, therefore, that when the terms breathable gas or compressed air are used in this application, such terms are intended to also include other types of gas mixtures both common and uncommon to the scuba diving industry. Another compressed gas mixture which may benefit from the present invention includes argon which is occasionally used in conjunction with dry suit inflation rather than breathable gas mixtures. These applications will be discussed in greater detail below.

The tank 14 of the scuba unit 10 includes a gas inlet/outlet valve 16 which typically includes a valve body portion 18 threadable into the tank 14, a hand operated control knob 20 for opening and closing the valve 16, and an inlet/outlet opening 22. In one form of tank valve connection, that is the yoke-type valve, the opening 22 generally includes a recessed area 24 which contains a small orifice 26 that communicates with the interior of the tank 14 through the valve body portion 18. An annular ridge 28 surrounds the recess 24 to form an annular groove wherein a removable O-ring 30 is provided between the ridge 28 and the recess 24. This arrangement insures an airtight seal with any device that is secured to the opening 22. This particular arrangement for the valve 16 is for attachment to a yoke-type regulator as described below. The other basic tank inlet/outlet arrangement (not illustrated) is designed for attachment to a DIN valve, and in this embodiment the ridge 28 is in the form of a collar which projects substantially outwardly from the valve body 18 and includes threads that are designed for threaded engagement with a DIN valve regulator as described further below.

The regulator assembly 12 is a dual or two-stage regulator and typically includes a first stage regulator member 32 and a second stage regulator member 33. The first stage regulator member 32 is removably secured to the tank valve outlet 22 and is designed to reduce the gas pressure from the tank 14 of 3000 or more psi to an intermediate gas pressure of approximately 140 psi. The intermediate pressure gas then passes through a hose 36 to the second stage regulator member 33, wherein the gas pressure is further reduced to ambient pressure which is dependent upon the depth of the scuba diver. In this manner, the diver can readily breathe the gas from the second stage regulator member 33 at any depth.

In a yoke-type regulator, the housing 34 includes a gas inlet opening 38 which is surrounded by a raised collar or flange 40. A metal filter member 42 is positioned within the housing 34 below the opening 38 for the purpose of filtering any and all gas and other materials entering the opening 38. A C-clip 44 is utilized to hold the filter 42 in the opening 38. A nut 46 maintains a yoke 48 in position at the opening 38. The yoke 48 is typically a U-shaped or an A-shaped element that is sized sufficiently to permit the tank valve 16 to be positioned between the collar 40 and the top of the yoke 48. A hand knob 50 with a screw member 52 passes through the top of the yoke 48 in is designed to tighten against the backside 53 of the tank valve 16 to press the collar 40 against the ridge 28 and O-ring 30 of the tank valve 16 to secure the two members together. In certain regulator designs, the nut 46, the collar 40, the filter 42 and the C-clip 44 are all part of a valve housing which is threadably secured within a bore disposed in the regulator housing 32. In other designs, these components are individually mounted within the bore as an integral part of the housing 32.

As is clearly evident, when the first stage regulator member 32 is not secured to a tank valve 16, liquid and other contaminants including airborne particulates can enter the inlet opening 38 and pass into the filter 42 and the rest of the regulator assembly 12. Since it is a recommended procedure to thoroughly rinse or soak all scuba diving equipment in clean fresh water after each use, entry of water into the inlet opening 38 would prove disastrous to the proper operation of the regulator assembly 12. This is because water will rust and corrode the internal metal components of the regulator assembly 12 as well as damage other attached components such as a dive computer, and particulate contaminants can block small orifices and otherwise cause galvanic or other reactions within the regulator assembly 12, all of which will at least negatively affect the operation of the regulator and possibly cause it or its attached components to fail entirely. It would be a dangerous situation if the first stage regulator member failed during its use by a scuba diver while under water.

This problem has been well recognized since the advent of the scuba unit, and for well over 50 years the answer has been to provide a dust cover 54. The dust cover 54 is generally made of plastic or rubber and is removably positioned over or against the collar 40 when the first stage regulator member 32 is not in use. The screw 52 is tightened against the top 56 of the dust cover 54 to press the dust cover 54 firmly against the inlet opening 38, thereby preventing entry of water and other contaminants. A similar removable cap arrangement is utilized for the second stage regulator alternate air source as described below. Unfortunately, it is a common mistake to forget to place the dust cover 54 over the inlet opening 38 before rinsing the regulator assembly 12, thereby flooding the first or second stage regulator members 32, 33. Alternatively, the dust cover 54 may be positioned properly but is not sufficiently tight to prevent entry of water into the inlet opening 38. The present invention obviates the requirement for the dust cover 54 and the entire problem inherent with its use.

The fluid flow control valve of the present invention can be constructed and designed as a separate valve unit which is threadably secured within a regulator member housing. Alternatively, the valve assembly of the present invention can be formed as an integral part of the regulator assembly housing so that only the individual components are removable rather then the entire valve assembly containing the individual components as in the first instance. Therefore, it should be understood that while the specific embodiments illustrated herein may be in one form or the other, the present invention is not to be specifically limited to either form. Moreover, while the specific embodiments illustrated and discussed below are specific adaptations for use with a scuba diving regulator assembly, the present invention is not to be limited thereby and may be utilized with any type of fluid inlet control valve wherein the fluid is under compression. Thus, the present invention should be limited only by the claims as set forth at the end of this application and as interpreted in view of the prior art.

Referring now with particularity to the embodiment illustrated in FIGS. 5–14, a fluid flow control valve 60 includes a housing 62 having a top or inlet end 64, a central shaft 65 and a bottom or outlet end 66. The housing 62 may be made of any suitable water-resistant material and is preferably galvanized metal. The inlet end 64 of the housing 62 is the functional equivalent of the inlet opening 38 illustrated in FIGS. 1 & 2. The housing shaft 65 includes a threaded portion 68 which is designed to engage a bore 69 (FIG. 14) disposed within the first stage regulator housing 34. A nut-shaped portion 70 is the functional equivalent of the nut 46 illustrated in FIGS. 1 & 2 and is designed to assist in threadably engaging the valve housing 62 into the regulator housing 34 as well as to hold the yoke 48 in position. A removable O-ring 72 is provided to help maintain a watertight seal and keep the interior of the regulator housing 34 dry as well as prevent the escape of pressurized gas. A raised collar 74 is provided for engagement against the O-ring 30 of the tank valve inlet opening 22, and a groove 76 is disposed radially inwardly from the collar 74 to assist in the engagement of collar 74 against the tank valve inlet opening 22 as well as providing a channel for draining loose water away from the inlet opening. This enables the inlet end 64 to remain free from water to prevent its inadvertent entry into the housing 62.

An axial bore 78 extends along the interior length of the housing 62. The diameter "y" of the bore 78 is substantially uniform along its entire length except for the portion adjacent the upper or inlet end 64. The end opening the 80 of the bore 78 has a diameter "x" narrower than the diameter "y" of the bore 80. In preferred form, an annular curved radial lip 82 is formed in the upper end portion of the bore 78 so as to narrow the diameter "y" of the bore 78 gradually to form the opening 80 having a diameter "x". An annular internal groove 84 is provided within the bore 78 proximate the lower or bottom end portion 66 of the housing 62 and is sized to mount a removable C-clip 86 therein.

A pressure responsive member or element 88 is positioned within the bore 78 proximate the upper or inlet end 64. In this particular embodiment, the pressure responsive element 88 is in the form of a piston 90 having a head portion 92 terminating in an upper curved surface 94 which seals against the lip 82 and projects outwardly from the opening 80. This outward projection also assists in keeping water away from the junction of the opening 80. It should be understood that while curved upper surfaces at the end of the pressure responsive element 88, such as the surface 94, are preferred and illustrated throughout this application, other surface shapes and arrangements may be used to plug or seal the opening 80.

An internal pocket 96 is formed in the lower portion of the piston 90 and terminates in an end opening 98. A plurality of fluid channeling elements preferably in the form of longitudinal channels or grooves 100 are disposed along the outer surface of the piston 90 and extend from the end opening 98 and terminate short of the upper curved surface 94. In this manner, fluid cannot flow along the channels 100 unless the head portion 92 has been disengaged from the lip 82 and the opening 80. In preferred form, a bias mechanism in the form of a coiled spring 102 is provided and is sized to fit within the pocket 96. The upper end portion 104 of the coiled spring 102 terminates at the upper end portion of the pocket 96, while the lower end portion 106 of the coiled spring 102 extends outwardly from the pocket 96. In preferred form, a spring containment sleeve 108 is provided having an internal cavity 110 for receiving the lower end portion 106 of the coiled spring 102. The sleeve 108 terminates a base portion 110 which includes a plurality of notches 112 which are preferably sized and spaced according to the longitudinal channels 100 of the piston 90. A metal filter element 114 having an enlarged base 115 is provided below the containment sleeve 108 and is sized and shaped to block the entire bore 78 so that any fluid passing through the bore 78 must pass through the filter 114. The c-clip 86 is preferably positioned within the annular groove 84 below the metal filter 114.

Referring particularly to FIG. 8, the inlet valve 60 is illustrated in a closed position wherein the upper curved surface 94 of the piston 90 is in firm contact with the annular lip 82 so as to seal the opening 80 to the bore 78. The bias mechanism in the preferred form of the coil spring 102 creates a bias force against the piston 90 and the bottom of the containment sleeve 108 so as to press the upper surface 94 against the internal lip 82. The containment sleeve 108, the filter 114 and the c-clip 86 are all sized, shaped and positioned so that the bias mechanism 102 provides sufficient bias force to close the piston 90 against the lip 82 and seal the opening 80. In this closed position, neither fluid, liquid or particulate matter of any kind can pass into the bore 78 through the inlet 80.

Referring to FIG. 13, when a compressive force is exerted axially against the upper surface 94 of the piston 90 and is of sufficient strength to overcome the bias force of the spring 102, the piston 90 moves axially into the bore 78. This movement of the piston 90 disengages the upper surface 94 from the annular lip 82 thereby opening the end 80. Fluid may then pass through the opening 80 and into the bore 78. The channels 100 and the notches 112 permit such fluid entering the opening 80 to pass along the exterior length of the piston 90 and the containment sleeve 108, through the filter 114, and to exit out the end opening 116 of the bore 78.

Figure 14:
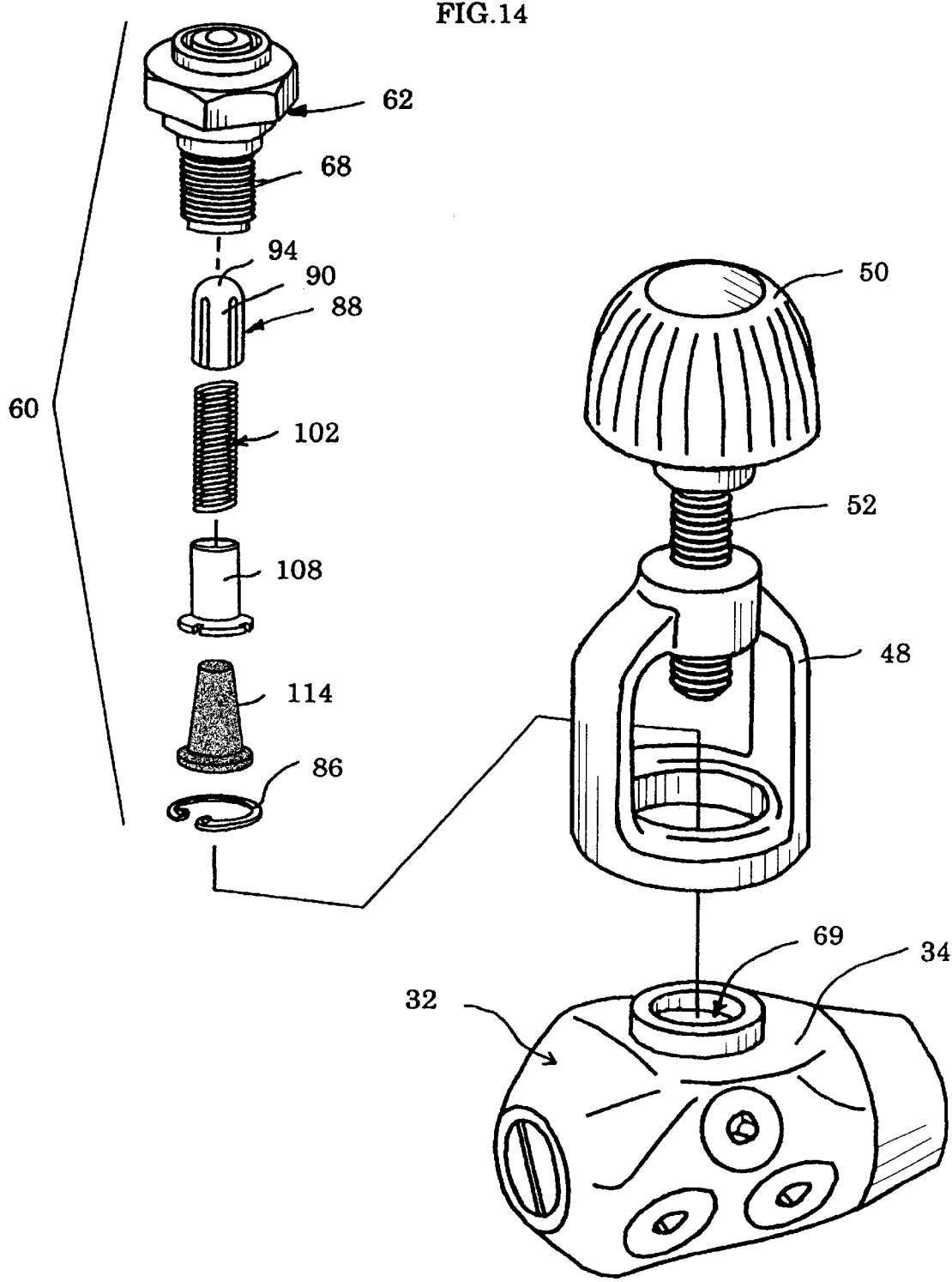
FIG. 14 is an exploded perspective view of a first stage regulator member with a yoke connection modified to include an inlet valve embodiment constructed in accordance with the present invention with its components in position for mounting within the inlet portion thereof.

As a result of the above arrangement and referring now to FIG. 14, when the valve 60 forms the inlet opening for a first stage regulator member 32, the normally closed position of the valve 60 resulting from the bias force of the spring member 102 as illustrated in FIG. 8 prevents water and airborne particulates from entering the first stage regulator housing. This construction eliminates the need for the dust cap 54 in that the piston 90 which is engaged against the annular lip 82 will seal the inlet valve 60 from any exterior fluid or contaminant material. When a first stage regulator member 32 containing the valve 60 of the present invention is attached to a scuba tank outlet valve 16, however, the force from the compressed gas in the tank 14 overcomes the bias force of the spring 102 to press the piston 90 into the bore 78. This action permits the compressed gas to pass through the bore 78, out the exit opening 116 and into the regulator housing 34. The bias force of the spring 102 may be adjusted to any desired strength. However, in order to permit the maximum amount of breathable gas from the tank 14 to be utilized by a scuba diver through the first stage regulator member, the bias force is preferably set as low as possible yet of sufficient strength to firmly engage the upper surface 94 against the annular lip 82 to close the opening 80 when the first stage regulator member 12 is not attached to a scuba tank 14. While this bias strength force may be selected at any level, a minimum force of preferably 5–10 psi should probably be established to prevent inadvertent entry of fluid or contaminants into the bore 78 and regulator member 32 when the regulator member 32 is disconnected from a scuba tank outlet valve 16. It should be understood, however, that this minimum force is a variable which may be selected and adjusted as needed.

Figures 15, 16, 17:
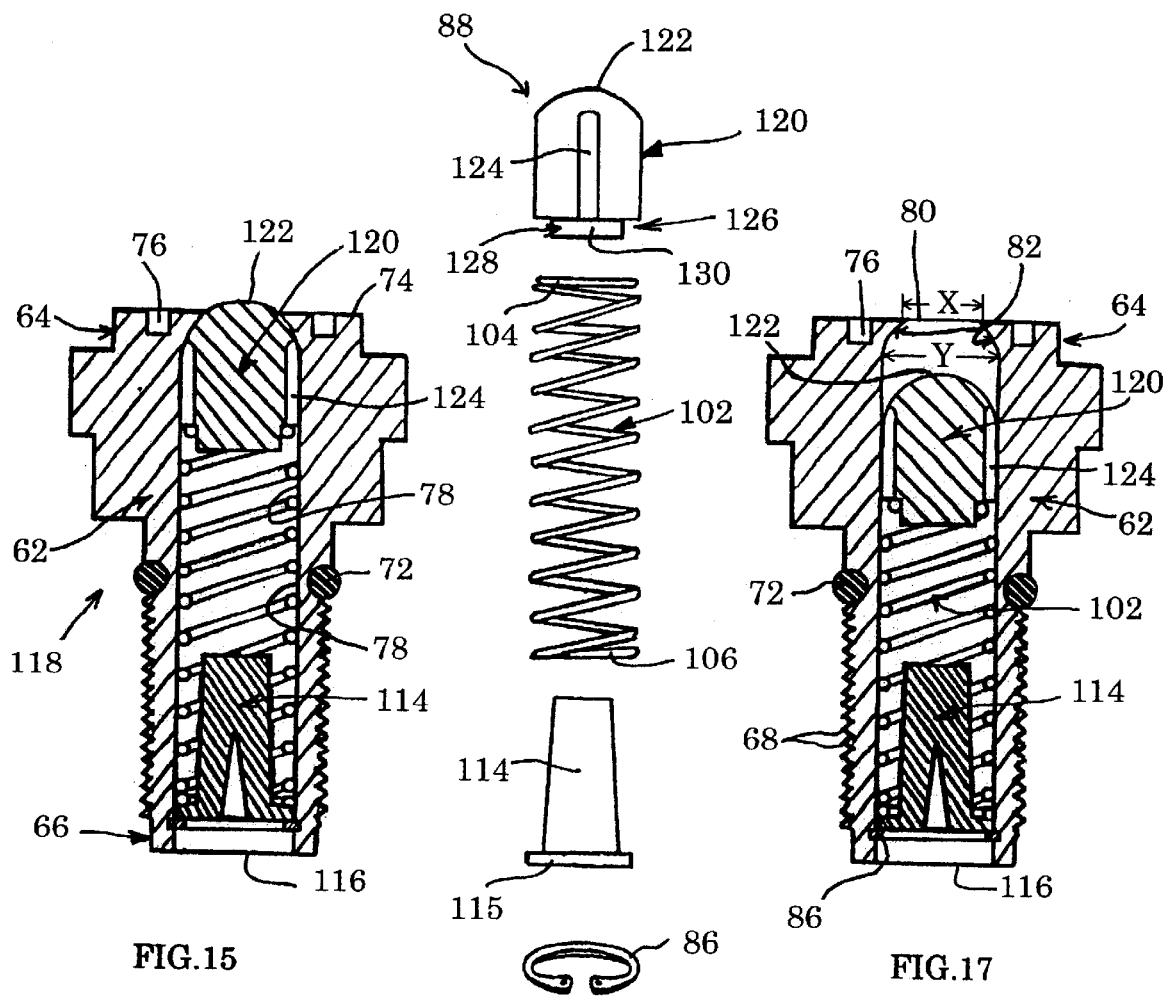
FIG. 15 is a cross-sectional view illustrating a second yoke-style inlet valve embodiment constructed in accordance with the present invention and in a closed position to prevent fluid flow therethrough.
FIG. 16 is an exploded plan view of the internal components of the inlet valve embodiment illustrated in cross-section in FIG. 15.
FIG. 17 is a cross-sectional view substantially similar to FIG. 15 but illustrating this inlet valve embodiment in an open position to permit fluid flow therethrough.

Referring now to FIGS. 15–17, a second embodiment of the fluid flow control valve of the present invention is disclosed. This embodiment is preferably in the form of a valve member 118 that includes a housing 62 constructed substantially identical to the prior embodiment of FIGS. 5–14. The housing 62 of this embodiment includes the upper or inlet end portion 64, an bottom or outlet end portion 66, a central bore 78, an annular inner lip 82 forming a narrowed end opening 80, and an exit opening 116. In this particular embodiment, the bias mechanism is also a coil spring 102. However, in this embodiment, the lower end portion 106 of the spring 102 is positioned around the filter member 114 against the base 115 thereof. There is no spring containment sleeve in this embodiment. The upper end portion 104 of the spring 102 is engaged with a pressure responsive element 88 as in the prior embodiment.

In this particular embodiment, the pressure responsive element 88 is preferably in the form of a solid piston head 120 having an upper curved surface 122 similar to the surface 94 of the prior embodiment. A plurality of axially aligned and spaced longitudinal grooves 124 form fluid channeling elements and operate in the same manner as the grooves 100 of the prior embodiment. However, the bottom portion 126 of the piston head 120 includes a raised element 128 which forms an annular shoulder 130. The upper end portion 104 of the spring 102 is sized to surround the shoulder 130 to securely engage the end portion 126 of the piston head 120. When the valve member 118 is in its closed position as illustrated in FIG. 15, the piston head upper surface 122 engages the annular lip 82 so as to close the opening 80. When a fluid force is exerted axially against the piston head upper surface 122, the piston head is moved into the bore 78 as with the prior embodiment to allow the fluid to pass through the opening 80, through the channels 124, through the filter 114 and out the exit opening 116. Again, when the valve member 118 is utilized with a scuba regulator, the fluid exerting the pressure on the piston head upper surface 122 is preferably compressed breathable gas.

Figures 18, 19, 20:
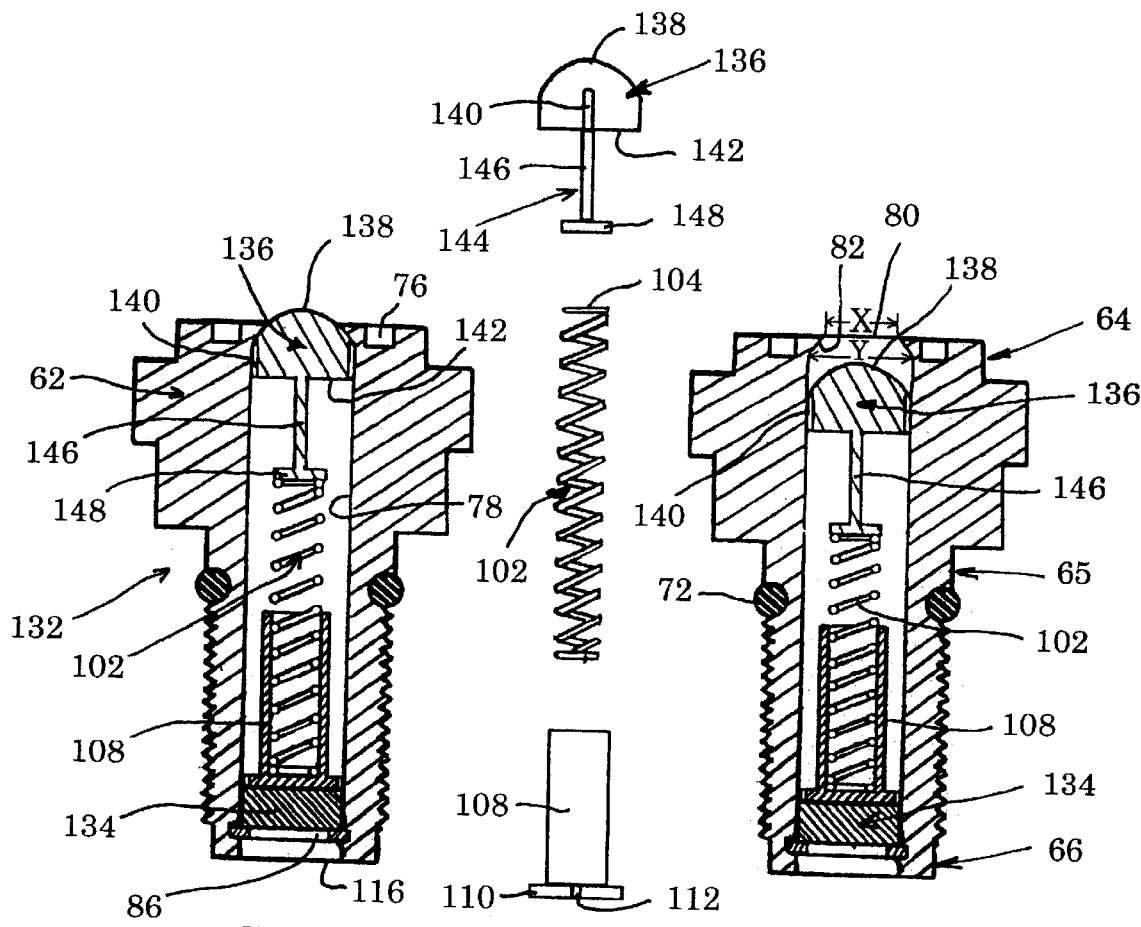
FIG. 18 is a cross-sectional view illustrating a third yoke-style inlet valve embodiment constructed in accordance with the present invention and in a closed position to prevent fluid flow therethrough.
FIG. 19 is an exploded plan view of the internal components of the inlet valve embodiment illustrated in cross-section in FIG. 18.
FIG. 20 is a cross-sectional view substantially similar to FIG. 18 but illustrating this third inlet valve embodiment in an open position to permit fluid flow therethrough.

Referring now to FIGS. 18–20, a third embodiment of the fluid flow control valve of the present invention is disclosed. This embodiment is preferably in the form of a valve member 132 that includes a housing 62 constructed substantially identical to the prior embodiments for FIGS. 5–17. The housing 62 of this embodiment includes the upper or inlet end portion 64, an bottom or outlet end portion 66, a central bore 78, an annular inner lip 82 forming a narrowed end opening 80, and an exit opening 116. In this embodiment, the bias mechanism is also a coil spring 102, and the lower end portion 106 of the spring 102 is positioned to be engaged within a spring containment sleeve 108 having a base portion 110 with notches 112, as in the embodiment of FIGS. 5–14. In this particular embodiment, however, the filter member 134 is substantially flat as opposed to the conical shape of the prior embodiments, the c-clip 86 holding all the internal components of the valve 132 in place within the bore 78. The upper end portion 104 of the spring 102 is engaged with a pressure responsive element 88 as in the prior embodiments.

In this particular embodiment the pressure responsive element 88 is in the form of a solid element 136 having an upper curved surface 138 similar to the surfaces 94 and 122 of the prior embodiments. A plurality of axially aligned and spaced longitudinal grooves 140 form fluid channeling elements and operate in the same manner as the grooves 100 and 124 of the prior embodiments. However, the bottom portion 142 of the element 136 includes a plunger mechanism 144 having a shaft 146 extending downwardly from the bottom 142 and an annular foot 148. The upper end portion 104 of the spring 102 engages the foot 148 to exert and transfer the bias force from the spring 102 to the element 136. When the valve member 132 is in its closed position as illustrated in FIG. 18, the element upper surface 138 engages the annular lip 82 so as to close the opening 80. When a fluid force is exerted axially against the element upper surface 138, the element 136 is moved into the bore 78 as with the prior embodiments to allow the fluid to pass through the opening 80, through the channels 140, through the notches 112, through the filter 134 and out the exit opening 116. Again, when the valve member 118 is utilized with a scuba regulator, the fluid exerting the pressure on the element upper surface 138 is preferably compressed breathable gas. When the fluid pressure ceases to be exerted against the element upper surface 138, the bias force from the spring mechanism 102 pushes the element 136 axially so as to reengage the upper surface 138 with the annular lip 82 thereby closing the valve 132.

Referring now to FIGS. 21–23, a fourth embodiment of the fluid flow control valve of the present invention is disclosed. This particular embodiment includes a valve member 150 that is substantially identical to the valve member 118 of FIGS. 15–17 except for the construction of the pressure responsive element 88. In this embodiment as with all the embodiments, like numerals designate like parts. In this particular embodiment, the pressure responsive element 88 is in the form of a solid piston head 152 having an upper curved surface 154 similar to the surface 122 of the embodiment of FIGS. 15–17. A plurality of axially aligned and spaced longitudinal grooves 156 form fluid channeling elements and operate in the same manner as the grooves 124 of the prior embodiment. However, the bottom portion 158 of the piston head 152 includes an annular, radially recessed groove 160 which forms a radial shoulder 162. The upper end portion 104 of the spring 102 is sized to surround the shoulder 162 and seat in the groove 160 to securely engage the end portion 158 of the piston head 152. When the valve member 150 is in its closed position as illustrated in FIG. 21, the piston head upper surface 154 engages the annular lip 82 so as to close the opening 80. When a fluid force is exerted axially against the piston head upper surface 154, the piston head is moved into the bore 78 as with the prior embodiment to allow the fluid to pass through the bore 78, through the channels 156, through the filter 114 and out the exit opening 116. Again, when the valve member 150 is utilized with a scuba regulator, the fluid exerting the pressure on the piston head upper surface 154 is preferably compressed breathable gas.

Figures 24, 25, 26:
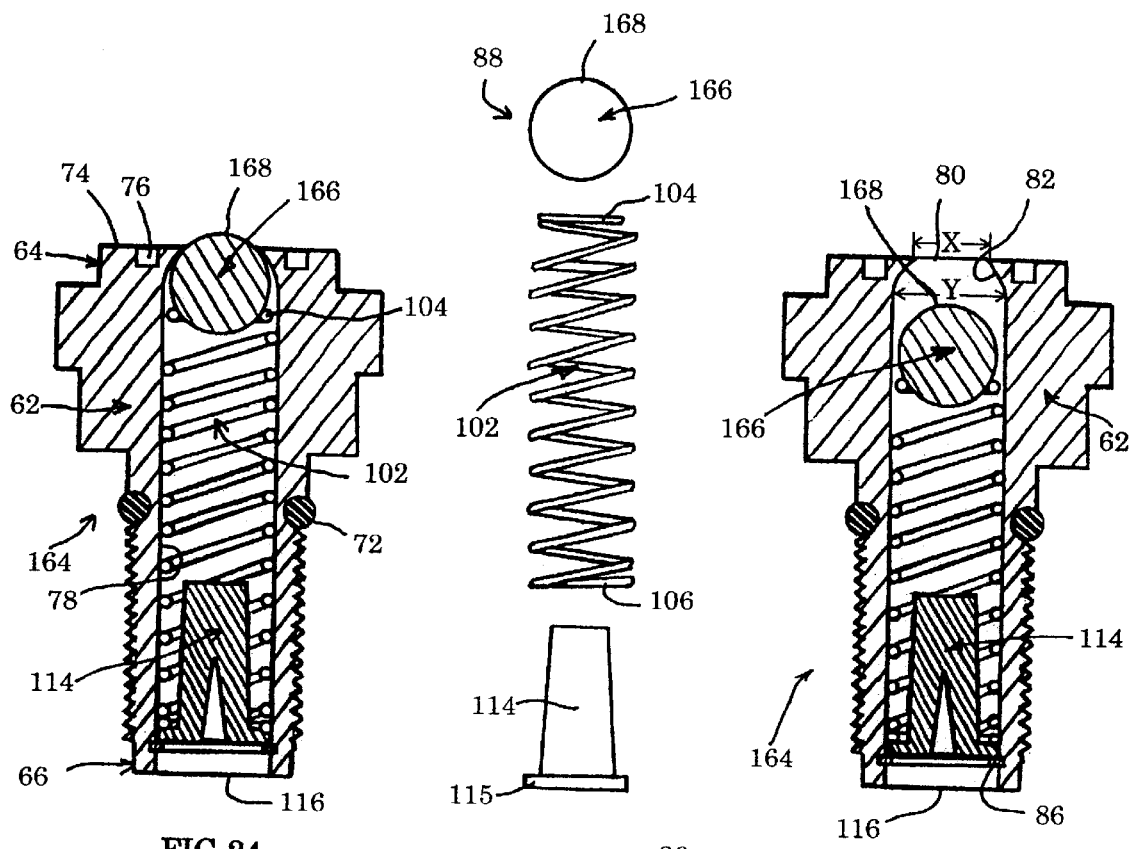
FIG. 24 is a cross-sectional view illustrating yet another yoke-style inlet valve embodiment constructed in accordance with the present invention and in a closed position to prevent fluid flow therethrough.
FIG. 25 is an exploded plan view of the internal components of the inlet valve embodiment illustrated in cross-section in FIG. 24.
FIG. 26 is a cross-sectional view substantially similar to FIG. 24 but illustrating this particular inlet valve embodiment in an open position to permit fluid flow therethrough.
Figure 27:
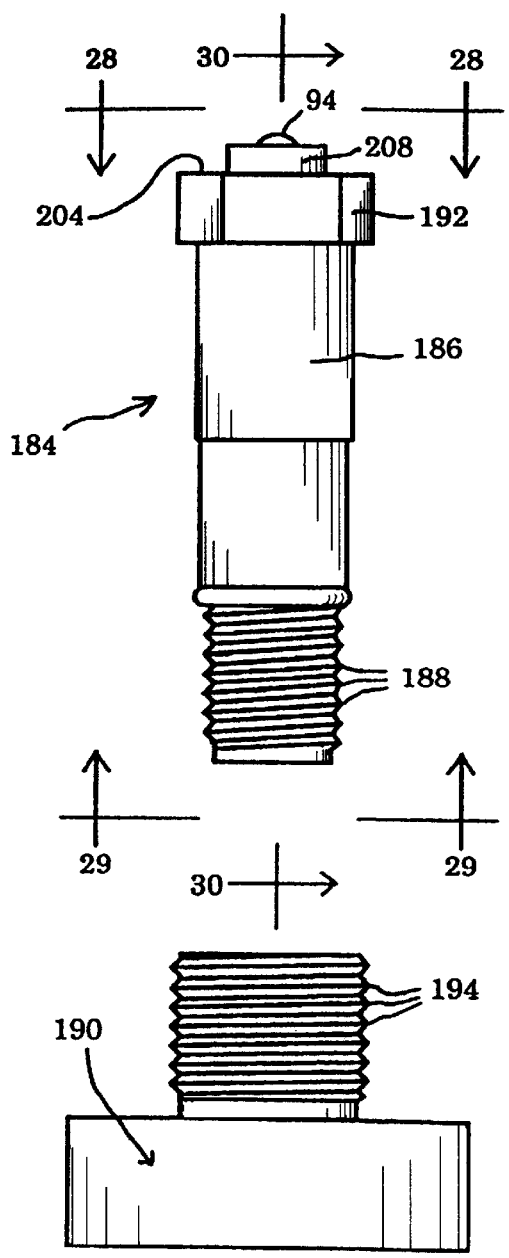
FIG. 27 is a side plan view of a DIN-style inlet valve embodiment and connection arrangement as constructed in accordance with the present invention.
Figure 28:
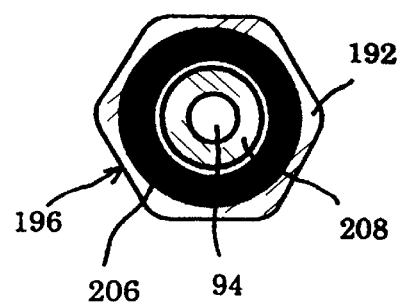
FIG. 28 is a top plan view taken substantially along line 28—28 of FIG. 27.
Figure 29:
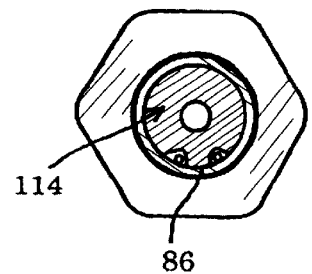
FIG. 29 is a bottom plan view taken substantially along line 29—29 of FIG. 27.

Yet another embodiment of the fluid flow control valve of the present invention is illustrated in FIGS. 24–26. This embodiment includes a valve member 164 that is substantially similar to the valve member 150 of the prior embodiment of FIGS. 21–23 except for the construction of the pressure responsive element 88. In this particular embodiment, the pressure responsive element 88 is preferably in the form of an orb or ball 166 having a continuous curved outer surface, any portion of which may serve as an upper curved surface 168 similar to the surface 154 of the embodiment of FIGS. 21–23. The ball 166 is sized to have a diameter greater than the diameter "x" of the opening 80, yet smaller than the diameter "y" of the bore 78. The ball 166 is seated in the upper end portion 104 of the spring 102 and held in position on the spring 102. When the valve member 164 is in its closed position as illustrated in FIG. 24, a portion of the surface of the ball 166 engages the annular lip 82 so as to close the opening 80. When a fluid force is exerted axially against the ball upper surface 168 projecting slightly beyond the opening 80, the ball 166 is moved into the bore 78 as with the prior embodiments. The fluid is then allowed to pass into the bore 78, past the outer surface of the ball 166 which has a narrower diameter than the bore 78, through the filter 114 and out the exit opening 116. Again, when the valve member 164 is utilized with a scuba regulator, the fluid exerting the pressure on the ball upper surface 168 is preferably compressed breathable gas.

Figures 32, 33, 34:
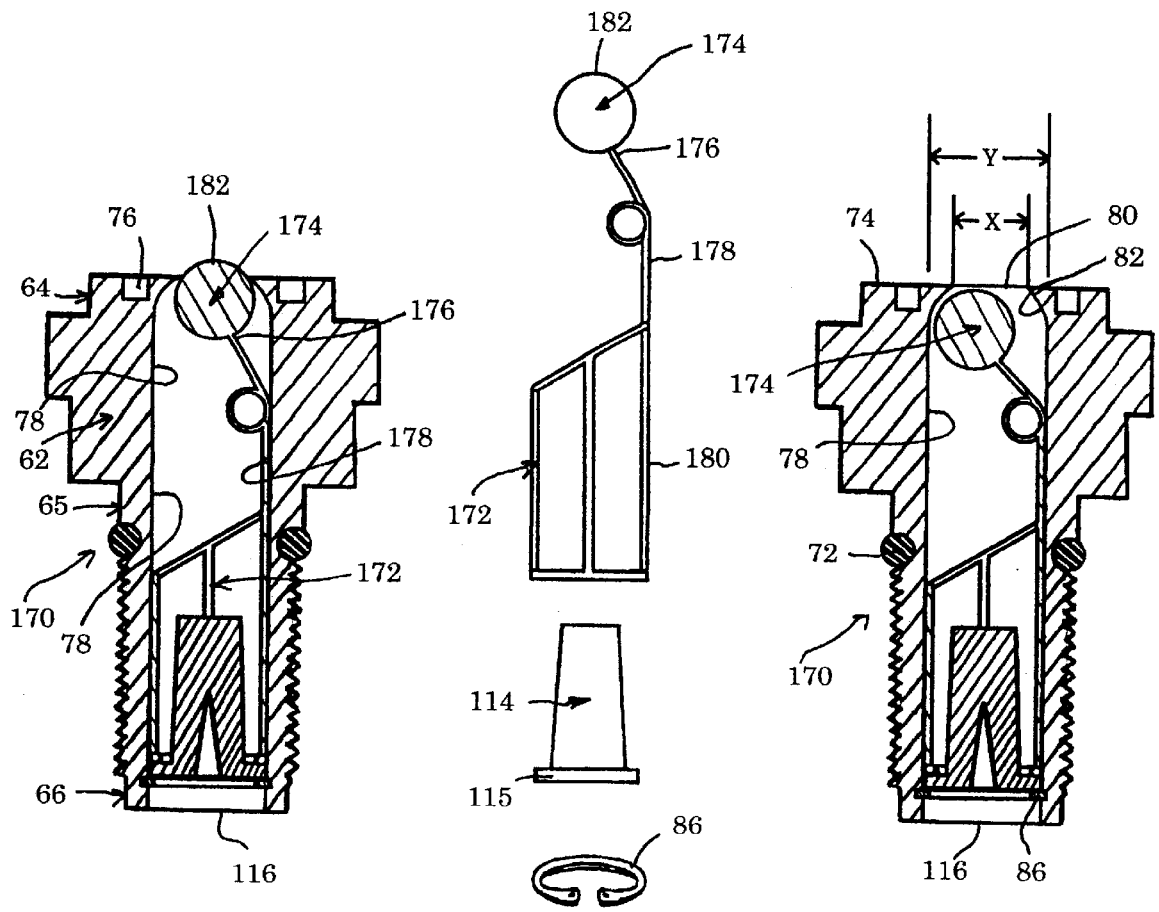
FIG. 32 is a cross-sectional view illustrating still another yoke-style inlet valve embodiment constructed in accordance with the present invention and in a closed position to prevent fluid flow therethrough and particularly illustrating an alternate bias mechanism.
FIG. 33 is an exploded plan view of the internal components of the yoke-style inlet valve embodiment illustrated in cross-section in FIG. 32.
FIG. 34 is a cross-sectional view substantially similar to FIG. 32 but illustrating the inlet valve embodiment in an open position to permit fluid flow therethrough.
Figure 35:
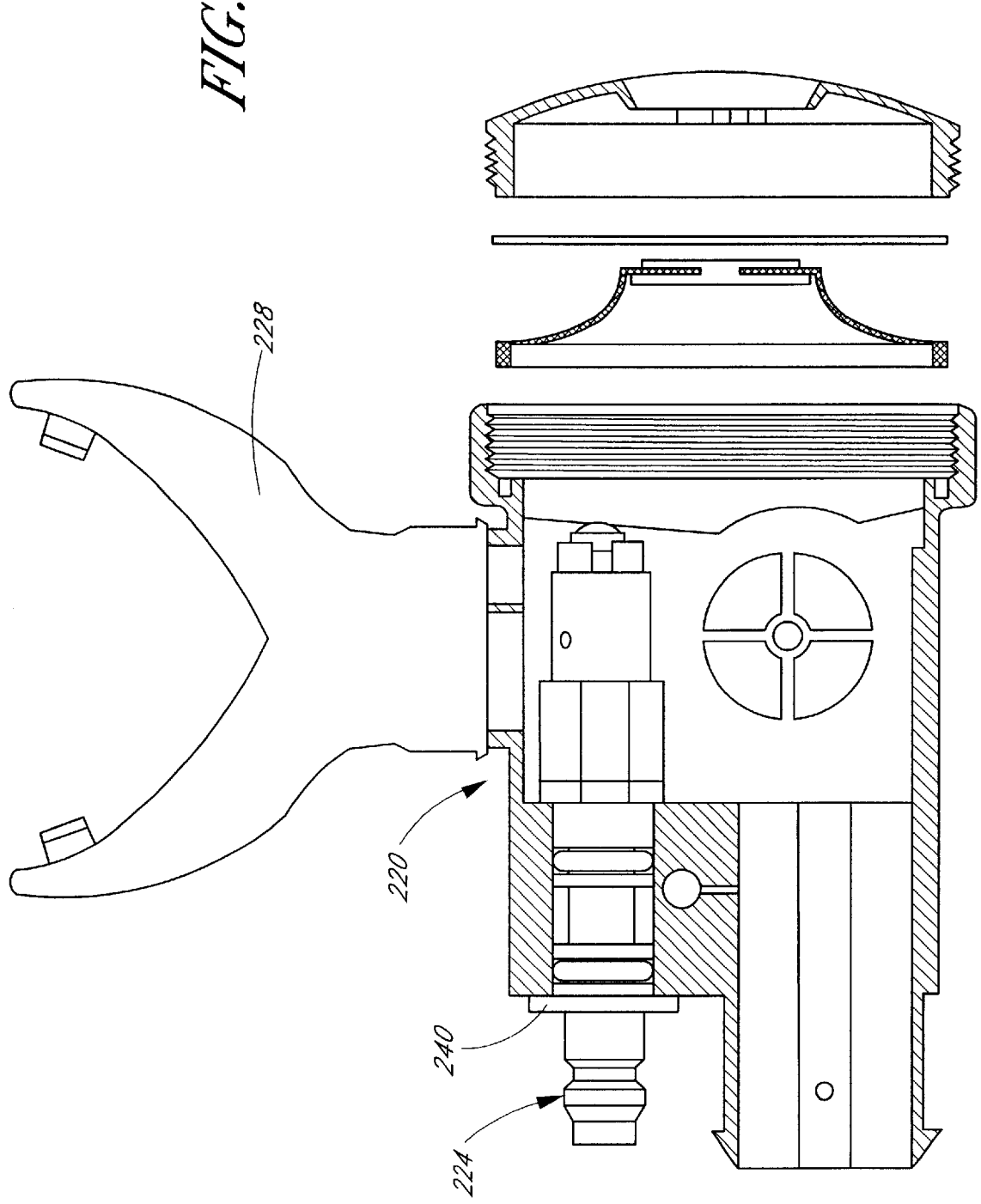
FIG. 35 is a top plan view, partially broken away, of a second stage, alternate gas regulator component of a known two stage regulator assembly having a quick connect/disconnect junction.

Referring now to FIGS. 32–34, still another embodiment of the fluid flow control valve of the present invention is illustrated. This embodiment is very similar to the embodiment of FIGS. 24–26 and includes a valve member 170 having a housing 62 structured substantially identical to the prior embodiments. The internal components of the valve member 170 are similar to those of the valve member 164 illustrated in FIGS. 24–26 except for the construction of the spring bias element 172 and its connection to the pressure responsive or sensing member 88. In this particular embodiment, the pressure responsive element 88 is again preferably in the form of an orb or ball 174 having a continuous curved outer surface. The spring bias element 172 includes an upper end portion 176 projecting from a spring lever arm 178, and a base cage portion 180. The cage portion 180 is sized and shaped to slidingly fit over a conical shaped metal filter 114 and rest on the filter base 115. The ball 174 is fixed to the distal end of the end portion 176.

The ball 174 is fixed to the upper portion 176 of the spring bias element lever arm 178 so that a portion of its upper outer surface may serve as an upper curved surface 182 similar to the surface 168 of the embodiment of FIGS. 24–26. The ball 174 is sized to have a diameter greater than the diameter "x" of the opening 80, yet smaller than the diameter "y" of the bore 78. The ball 178 is fixed to the upper distal end of the lever arm 178 so that when the valve member 170 is in its closed position as illustrated in FIG. 32, the ball upper curved surface 182 engages the annular lip 82 so as to close the opening 80. When a fluid force is exerted axially against the ball upper surface 182 projecting slightly beyond the opening 80, the ball 174 is moved angularly into the bore 78 controlled by the lever arm 178. The fluid is then allowed to pass into the bore 78, past the outer surface of the ball 174 having a narrower diameter than the bore 78, through the filter 114 and out the exit opening 116. Again, when the valve member 170 is utilized with a scuba regulator, the fluid exerting the pressure on the ball upper surface 182 is preferably compressed breathable gas. Upon cessation of the axial force from the compressed gas or other fluid, the lever arm 178 moves the ball 174 back into its closed position wherein the upper surface 182 engages the annular lip 82 and closes the opening 80.

Referring now to FIGS. 27–31, another embodiment of the invention is illustrated wherein it is adapted for use in a DIN valve arrangement. As previously explained, the DIN valve 184 includes a housing 186 with rear exterior thread members 188 that are designed to screw the housing 184 into a first stage regulator housing similar to the housing 32 of FIG. 1, only adapted for a DIN-style valve rather than a yoke-style valve. A separate attachment element 190 is designed to slide over the housing 184 and engage the nut portion 192 of the housing 184. The exterior threads 194 are designed to screw into a compatible aperture located in the outlet/inlet valve housing 16 of a scuba tank cylinder 14. The aforementioned elements of the DIN-style housing 184 are all standard features well known to the art. However, the remaining features of the valve 184 including the internal components thereof are all adapted in accordance with the teachings of the present invention.

The upper or fluid inlet end portion 196 of the housing 186 includes the nut 192, and the lower or fluid outlet end portion 198 of the housing 186 includes the exterior threads 188. A center shaft portion 200 interconnects the inlet portion 196 with the outlet portion 198. The upper end portion 196 includes an annular groove 202 disposed in the end surface 204 of the nut 192, and an O-ring 206 is disposed within the groove 202. An end collar 208 projects outwardly from the surface 204 of the nut 192. A central bore 210 is disposed within the housing 186 similar to the bore 78 of the prior embodiments and has a diameter "y". The bore 210 includes an inlet opening 212 having a diameter "x" which is less than the diameter "y" of the bore 210, again similar to the prior embodiments. The end opening 212 is disposed in the collar 208 and defines a curved annular interior lip 214. A pressure responsive or sensitive element 88, a spring bias mechanism 102 and a spring containment sleeve 108 similar to those of FIGS. 5–13 are preferably utilized within the bore 210 of the housing 186 of the present embodiment. Due to the fact that DIN-type valves 184 are considerably longer than yoke-type valves 60, a tubular spacer element 216 is positioned between the bottom of the containment sleeve base 112 and the base plate 115 of the fibrous metal filter 114. A c-clip 86 is utilized to maintain the position of all the aforementioned components within the bore 210.

As described in the previous embodiments, the pressure responsive element 88 preferably in the form of a piston 92 includes a curved upper surface 94. The upper surface 94 is shaped to firmly engage the inner annular lip 214 when the valve 184 is in its closed position as illustrated in FIG. 30. When fluid pressure, as in the form of compressed gas from a scuba tank, is exerted in an inward axial direction against the surface 94 of the piston 92 and is of sufficient strength to overcome the bias force applied by the spring 102, the spring 102 is compressed and the piston 92 moved axially inwardly into the bore 210. When this occurs, the fluid may then pass through the opening 212, through the fluid channels or grooves 100, through the notches 112, through the interior of the spacer 216, through the fibrous metal filter 114 and out the exit opening 218. As with the prior embodiments, undesirable fluids and particulate material cannot enter the valve 184 when it is in its closed position due to the bias force of the spring 102 against the piston 92. However, when pressurized fluid, such as in the form of compressed gas or air from a scuba tank, is exerted against the surface 94 of the piston 92, the piston 92 is moved and the gas or air passes through the valve 184 and into the first stage regulator.

Referring now to FIGS. 35–38, a second stage regulator member 220 is illustrated in the form of an alternate air or gas source as previously described. The illustrated regulator member 220 includes an air inflator valve 222 for controlling inflation of a buoyancy control device (not illustrated) typical in the art, and a quick disconnect valve 224. The quick disconnect valve 224 of standard exterior design is arranged for connecting an intermediate pressure hose such as hose 226 of FIG. 4 to the second stage regulator member 220. As previously described, the second stage regulator member 220 is designed to reduce the intermediate pressure of the compressed breathable gas from the hose 226 to ambient pressure so that a diver may readily breathe it through a mouth piece 228. The valve 224 includes a housing 230 which is threadably positioned within the regulator member 220. The housing 230 includes an inlet end portion 232 and an outlet end portion 234. The outlet end portion 234 includes exterior thread members 236 for engagement with a receiver nut 238 which is part of the regulator assembly 220. A pair flanges 240, 242 and a pair of O-rings 244, 246 assist in maintaining the valve housing 230 within the regulator member 220.

The housing 230 preferably includes an interior axial bore 248 which extends the length thereof. As in the prior embodiments, the axial bore 248 has a diameter "y" and terminates at the inlet end portion 232 in an inlet opening 250, which has a narrower diameter "x". An interior annular lip 252 is formed at the inlet portion 232 to define the opening 250. A pressure responsive or sensitive element 254 is preferably formed as a piston 256 having elongated channeling elements 258 in the form of grooves along the exterior surface thereof. An upper curved surface 260 is sized and shaped to engage the annular lip 252 so as to seal the opening 250 when the valve 224 is in its closed position as illustrated in FIG. 36. The spring bias member 262 is provided for engaging the interior of the piston 256 at its upper end portion 264. The lower end portion 266 of the spring bias member 262 is positioned within a containment sleeve 268 having a base 270 with fluid passage notches 272.

The base 270 of the containment sleeve 268 rests against a fibrous metallic filter 114, and a C-clip 86 is utilized as in the prior embodiments to maintain the components discussed above within the central bore 248. When an intermediate hose 226 is attached to the inlet end portion 232 of the valve 224 and compressed gas introduced therein, the pressure from the gas against the upper surface 260 of the piston 254 presses the piston 254 into the bore 248 (see FIG. 38) against the force of the bias member 262. As in prior embodiments, the compressed gas can then enter the inlet opening 250 to pass along the grooves 258 into the central bore 248, through the notches 272, through the filter 114 and then out the exit opening 274.

Figure 39:
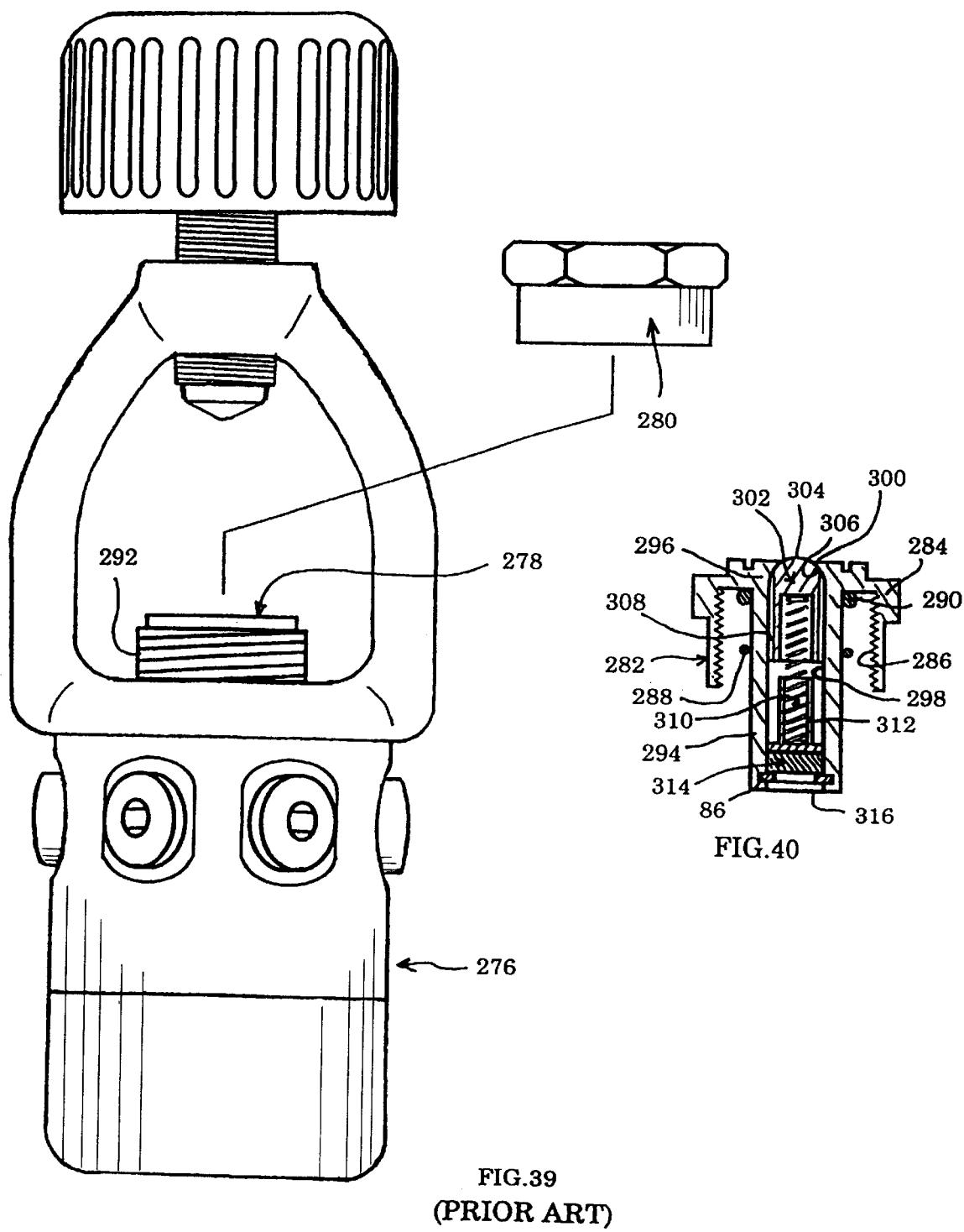
FIG. 39 is a perspective view of the first stage regulator component with a part in elevation of yet another known type of yoke-style two stage regulator device for a scuba unit.

Referring now to FIGS. 39 & 40, a standard and known first stage regulator member 276 is illustrated. The regulator member 276 includes an inlet opening 278 which contains a standard metal filter therein. An end cap or yoke retainer element 280 is utilized to seal the regulator end opening 278. This regulator member 280 may be modified for use with the present invention as illustrated in FIG. 40. In this instance, the end cap or yoke retainer nut 280 and the metal filter within the opening 278 are removed. In their place, an inlet valve 282 is inserted into the opening 278. The valve 282 includes a housing 284 having threads 286 and O-ring elements 288, 290 to engage the threads 292 to secure the housing 284 to the regulator member 276. A tubular element 294 extends downwardly from the upper surface 296 of the housing 282. The tubular element 294 includes a central bore 298 which extends the entire length thereof and terminates at the inlet end portion 296 in an opening 300 which has a narrower diameter than the bore 298, as in the prior embodiments. A pressure responsive element 302 includes an upper curved surface 304 which engages an annular inner lip 306 when in the closed position as illustrated in FIG. 40. A plurality of elongated channeling grooves 308 are disposed along the surface of the piston member 302. A biasing mechanism in the form of a coil spring 310 is positioned within the piston 302 and extends into a sleeve containment member 312. A flat fibrous metallic filter the form of a wafer-like structure 314 is positioned below the containment sleeve 312, and a c-clip 86 is utilized to maintain the internal components within the central bore 298. Again, when fluid pressure is exerted against the upper curved surface 304 of the piston member 302, the piston 302 is pressed into the bore 298 to enable the pressurized fluid to pass through the channeling grooves 308, through the filter 314 and out the exit opening 316.

Figure 41:
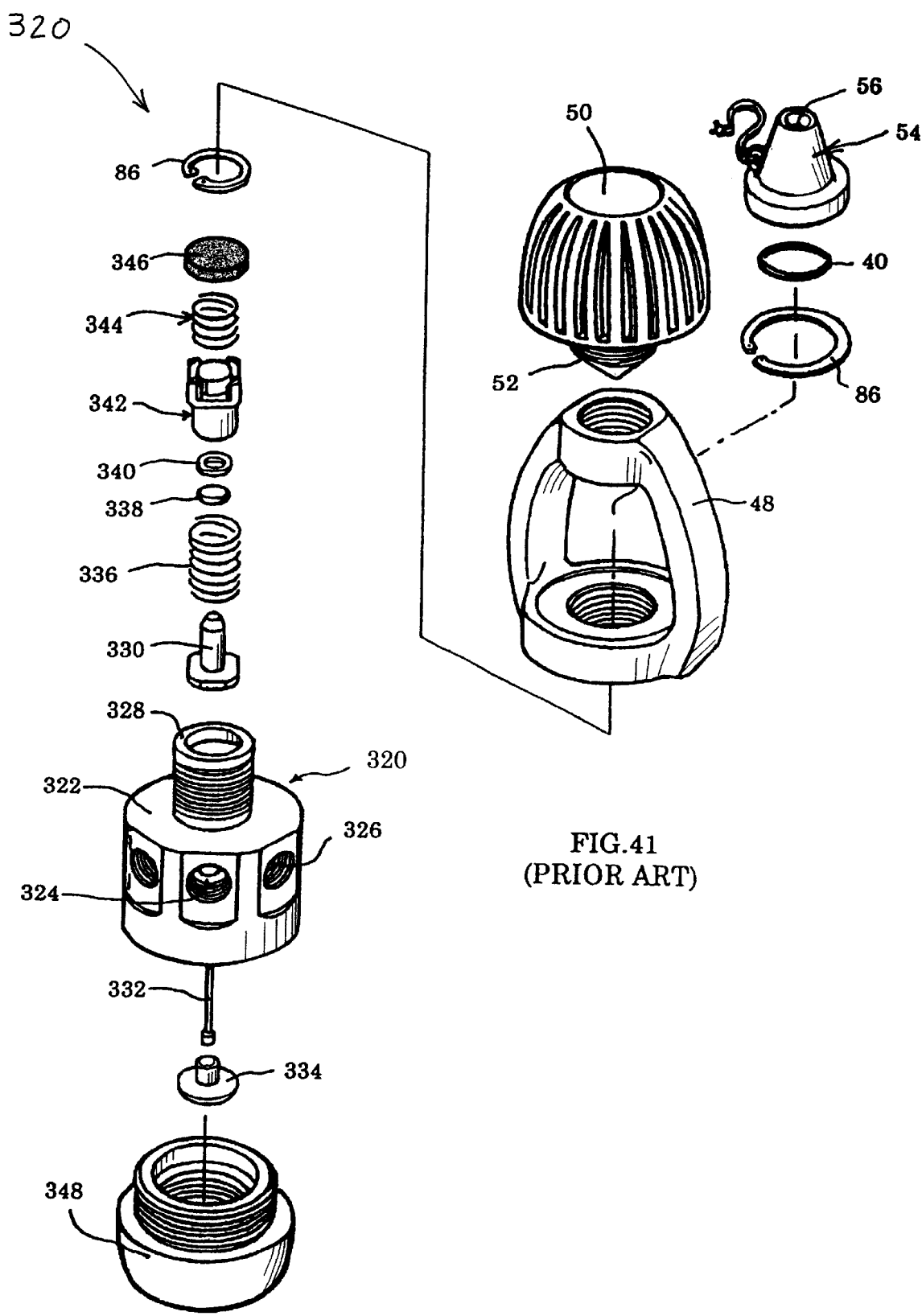
FIG. 41 is an exploded perspective view of the first stage regulator component of still another known type of yoke-style two stage regulator device for a scuba unit.
Figure 42:
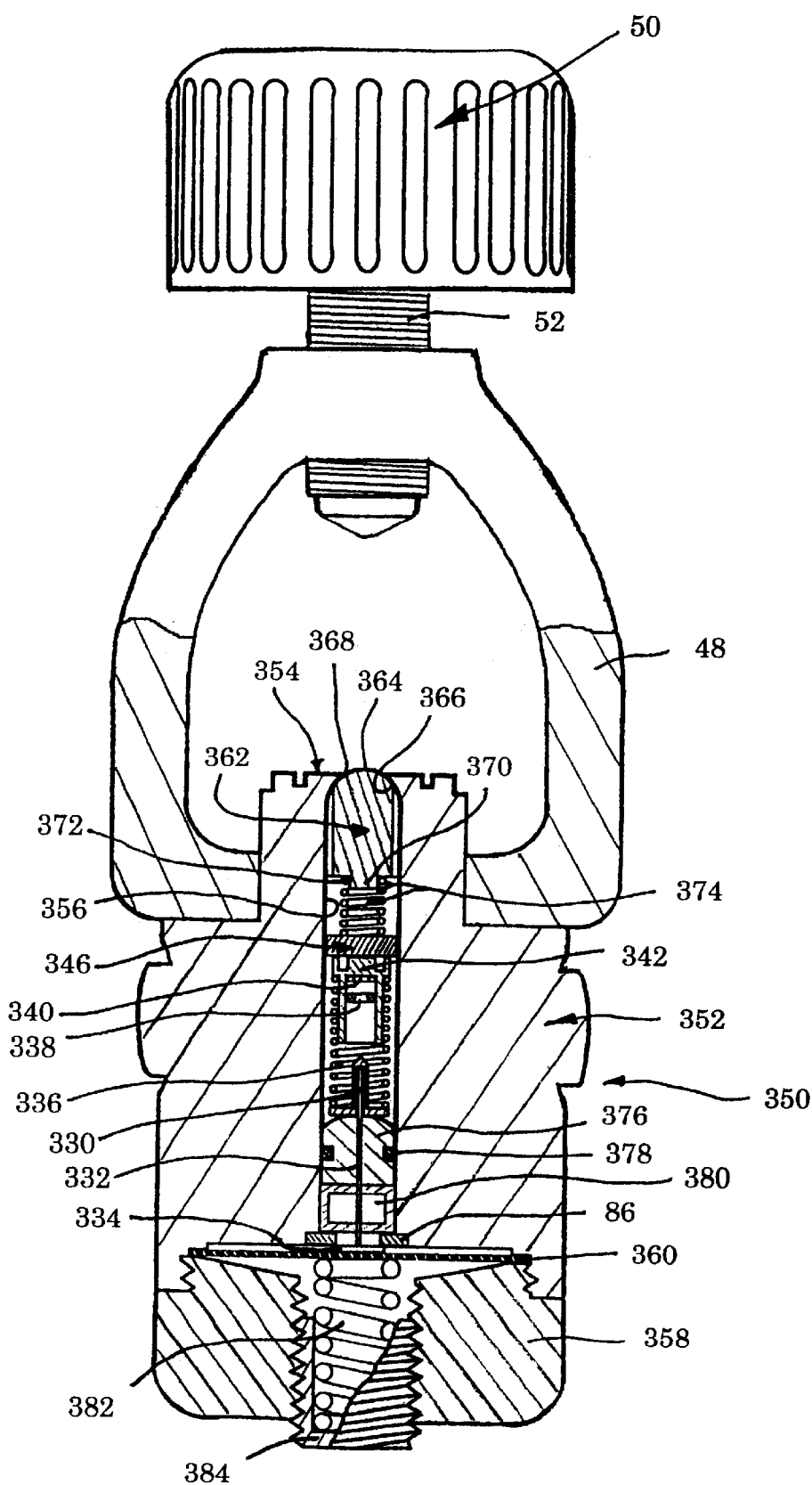
FIG. 42 is a partial sectional view of the unit illustrated in FIG. 41 modified to incorporate an inlet valve embodiment constructed in accordance with the present invention as an integral portion of the first stage regulator component thereof.

Referring now to FIGS. 41 & 42, another embodiment of the present invention is illustrated wherein the present invention is in the form of an integral valve arrangement disposed within a regulator housing. More specifically, a first stage regulator member 320 of standard design includes a housing 322, a plurality of high and low pressure outlets 324, 326, and an inlet element 328. A diaphragm (not illustrated) is typically positioned within the housing 322 below the inlet element 328. A high-pressure seat 330 is disposed within the housing 322 on the high-pressure side of the diaphragm. A pin 332 and a pin support 334 are provided for engaging the high-pressure seat 330. A spring 336, an O-ring 338 and a backup ring 340 are all disposed about the high-pressure seat 330. A spring block 342 is provided for engaging the upper end of the high-pressure seat 330. A second spring element 344 is positioned on the upper end of the spring block 342, and a filter member 346 is positioned thereon and maintained in place by a c-clip 86. An end cap 348, a yoke 48, a hand knob 50 and a dust cover 54 are also all provided. As can be seen by this assembly, the integral valve components within the valve housing 322 are all potentially exposed to water and solid contaminants if the dust cover 54 is not properly positioned as previously described.

Referring now to FIG. 42, the standard regulator 320 of FIG. 41 has been modified to incorporate the present invention as an integral part thereof. In this particular embodiment, the regulator member 350 includes a housing 352 having an inlet end portion 354. The housing 352 includes a central bore 356 which passes axially along the length thereof. An end cap 358 is threadably engageable with the base of the housing 352. A diaphragm of standard design 360 is positioned at the inner surface of the end cap 358. Disposed within the lower portion of the bore 356 within the housing 352 is a pin 332, a pin support 334, a high-pressure seat 330, a high-pressure seat spring element 336, an O-ring 338, the backup ring 340, and a spring block 342, all components standard to the known regulator member 320. In this particular in embodiment, however, a pressure responsive or sensitive element in the form of a piston 362 is positioned within the bore 356 at the inlet end portion 354. The piston 362 includes an upper curved surface 364, and an inner annular lip 366 is provided to define the end opening 368 of the bore 356. The diameter of the end opening 368 is less than the diameter of the bore 356 as in the prior embodiments. In this manner, the upper curved surface 364 of the piston 362 engages the annular lip 366 to seal the end opening 368 when the valve 350 is in its closed position as illustrated in the FIG. 42.

The lower end portion of the piston member 362 includes a projection 370 having a diameter less than the piston member 362 thereby forming an annular shoulder 372. A bias mechanism 374 preferably in the form of a coil spring is positioned between the piston element 362 and the filter 346, the upper end portion of the spring 374 being disposed about the annular shoulder 372. A removable high-pressure crown 376 with an O-ring 378 is provided below the high-pressure seat 330. A spacer element 380 is positioned between the crown 376, and a c-clip 86 is provided to maintain all the components in position within the bore 372. Finally, an intermediate spring 382 is provided on the intermediate pressure side of the diaphragm 360 and is disposed within the tightener element 384 which is engageable within the end cap 358. The tightener member 384 can be utilized to adjust the intermediate pressure of the diaphragm 360. As a result of this construction, the piston element 362 maintains the opening 368 in a sealed condition as a result of the bias from the spring 374. Once the housing 350 is attached to a source of pressurized gas, the force from the pressurized gas against the curved surface 364 presses the piston element 362 into the bore 356 to allow compressed gas to pass into the bore 356 and against the diaphragm 360.

As can be seen from the above, the present invention solves a problem which has existed from the very beginning of the sport of scuba diving. The present invention provides for a relatively simple yet very effective arrangement for preventing the inadvertent entry of water and other contaminants into the first or second stage regulator members of a scuba diving unit. The present invention eliminates the need for a manual dust cap and, more importantly, for the requirement that the user of a scuba diving unit remember to place the dust cap in position prior to cleaning and/or storing the equipment. The present invention can be constructed in any number of different forms so as to be compatible with virtually every type of first stage regulator member presently manufactured and sold. The present invention can be in the form of an independent valve member which may be utilized to retrofit existing first stage regulator members as well as used with newly manufactured regulator assemblies. In the alternative, the present invention can be constructed as an integral part of a regulator member with its components readily accessible for repair and/or replacement.

The present invention may also be utilized with second stage regulators when in the form of alternate air sources. Additionally, the present invention may be utilized with any type of gas used in the scuba diving industry, including all types of breathable gas mixtures as well as other types of systems that are used in scuba diving but not necessarily for breathing. Specifically, cylinders of compressed argon are utilized to inflate dry suits and are separate and apart from the breathing mixture for a scuba diver. The present invention may be utilized with the gas regulator for such compressed argon systems. Moreover, extended range scuba divers require the use of multiple compressed breathing gas tanks for decompression purposes. As such, the scuba diver, when performing such extended range functions, must change regulator connections between tanks while underwater. Heretofore, this process flooded the regulators, creating initial breathing problems as well as creating the difficulty of cleaning and drying the internal components of the regulators after the extended range dive was concluded. The present invention obviates these problems and permits easy changing of compressed gas bottles while underwater. Moreover, the present invention may also be utilized in an inlet valve arrangement for rebreather scuba units.

Finally, it should be understood that while the present invention was initially developed for the scuba diving industry, it has much broader implications and applications. It can be utilized with any type of fluid flow environment and device and should not be simply limited to gaseous fluids. Any type of device or system wherein fluid under pressure is directed into a one-way inlet valve may benefit from the present invention by being adapted in accordance therewith. Therefore, the present invention should not be limited by the specific illustrations and embodiments described in detail above.

The foregoing description and the illustrative embodiments of the present invention have been described in detail in varying modifications and alternate embodiments. It should be understood, however, that the foregoing description of the present invention is exemplary only, and that the scope of the present invention is to be limited only to the claims as interpreted in view of the prior art. Moreover, the invention illustratively disclosed herein suitably may be practiced in the absence of any element which is not specifically disclosed herein.

I claim:

1. An inlet valve for a gas pressure regulator to couple the regulator to a source of pressurized gas, said valve comprising:

a housing defining a central duct with gas inlet and outlet openings defined at opposite ends thereof, said housing having an attachment portion disposed at said gas inlet opening adapted for engagement with a source of pressurized gas;

a pressure responsive element mounted within said duct proximate said gas inlet opening and adapted for movement between a first position for sealing said duct to prevent gas from entering said inlet opening, and a second position for opening said duct to permit gas to enter said inlet opening and pass through said duct;

a mechanism disposed in said duct for exerting a preselected bias force against said pressure responsive element to maintain said pressure responsive element at said first position in the absence of gas pressure from outside said housing at said gas inlet opening in excess of said preselected bias force;

a gas filter member disposed in said duct downstream from said pressure responsive element; and a retainer element for removably securing said filter, said bias force exerting mechanism, and said pressure responsive element all within said duct;

wherein said source of pressurized gas is a gas hose, and said pressure regulator is a second stage regulator adapted to selectively engage a gas outlet portion of the gas hose delivering breathable gas of an intermediate gas pressure for use as an alternate gas source in a SCUBA system, said valve housing attachment portion comprising a quick connect element associated with said gas inlet opening for attachment to said intermediate gas pressure hose, said housing further including a threaded member for attaching said valve housing gas outlet opening to the second stage regulator.

2. In a regulator device for reducing the gas pressure of a source of pressurized breathable gas in a self-contained underwater breathing apparatus to a useable level when delivered to an underwater diver using said apparatus, the regulator device including a regulator housing, a gas inlet mechanism including a gas inlet valve for the regulator housing, pressure-sensing means for reducing gas pressure within the regulator housing at variable water depths, and an outlet mechanism for delivering breathable gas at a pressure level less than the pressure level of said gas at the gas inlet mechanism, the improvement wherein said gas inlet valve comprises:

a valve housing defining a tubular interior duct having gas inlet and gas outlet apertures at opposite ends thereof;

a gas flow control element positioned within said duct for movement between a first position to seal said gas inlet aperture to prevent entrance of gas and any other fluid into said duct, and a second position to open said gas inlet aperture to the flow of pressurized gas therethrough into said duct, said control element moving in a reciprocal manner within said tubular duct between said first and second positions;

a resilient member mounted in said duct in operative relation with said gas flow control element to create a bias force to regulate the movement of said gas flow control element between said first and second positions, the bias force created by said resilient member maintaining said gas flow control element at said first position absent sufficient pressure of breathable gas from said source at said inlet aperture to overcome the bias force of said resilient member, and a retainer member for removably securing said gas flow control element and said resilient member within said tubular duct;

wherein said regulator device comprises a second stage regulator for use as an alternate gas source in a SCUBA system with said source of pressurized breathable gas comprising the gas outlet portion of a gas hose delivering breathable gas of an intermediate gas pressure, and wherein said gas inlet valve housing further comprises an attachment portion in the form of a quick connect element associated with said gas inlet aperture for attachment to said intermediate gas pressure hose, and a threaded member for attaching said valve housing gas outlet aperture to said second stage regulator.

3. In a regulator device for reducing the gas pressure of a source of pressurized breathable gas in a self-contained underwater breathing apparatus to a useable level when delivered to an underwater diver using said apparatus, the regulator device including a regulator housing, a gas inlet mechanism including a gas inlet valve for the regulator housing, pressure-sensing means for reducing gas pressure within the regulator housing at variable water depths, and an outlet mechanism for delivering breathable gas at a pressure level less than the pressure level of said gas at the gas inlet mechanism, the improvement wherein said gas inlet valve comprises:

a valve housing defining a tubular interior duct having gas inlet and gas outlet apertures at opposite ends thereof;

a gas flow control element positioned within said duct for movement between a first position to seal said gas inlet aperture to prevent entrance of gas and any other fluid into said duct, and a second position to open said gas inlet aperture to the flow of pressurized gas therethrough into said duct, said control element moving in a reciprocal manner within said tubular duct between said first and second positions;

a resilient member mounted in said duct in operative relation with said gas flow control element to create a bias force to regulate the movement of said gas flow control element between said first and second positions, the bias force created by said resilient member maintaining said gas flow control element at said first position absent sufficient pressure of breathable gas from said source at said inlet aperture to overcome the bias force of said resilient member, and a retainer member for removably securing said gas flow control element and said resilient member within said tubular duct;

wherein said regulator device is a second stage regulator for use as an alternate gas source in a SCUBA system adapted to selectively engage a gas outlet portion of a gas hose delivering breathable gas of an intermediate gas pressure, said valve housing including an attachment portion comprising a quick connect element associated with said gas inlet aperture for attachment to said intermediate gas pressure hose, and a threaded member for attaching said valve housing gas outlet aperture to the second stage regulator.

4. A one-way inlet valve for a second stage regulator for use as an alternate gas source in a SCUBA system adapted to selectively engage a gas outlet portion of a gas hose delivering breathable gas of an intermediate gas pressure, said valve comprising:

a housing defining a central duct with gas inlet and outlet apertures defined at opposite ends thereof, said housing having an attachment portion comprising a quick connect element associated with from said gas inlet aperture for attachment to said intermediate gas pressure hose, and a threaded member for attaching said valve housing gas outlet aperture to the second stage regulator;

a pressure responsive element mounted within said duct proximate said gas inlet opening and adapted for movement between a first position for sealing said duct to prevent gas from entering said inlet opening, and a second position for opening said duct to permit gas to enter said inlet opening and pass through said duct;

a mechanism disposed in said duct for exerting a preselected bias force against said pressure responsive element to maintain said pressure responsive element at said first position in the absence of gas pressure from said intermediate pressure gas hose at said gas inlet opening in excess of said preselected bias force;

a gas filter member disposed in said duct downstream from said pressure responsive element; and a retainer element for removably securing said filter, said bias force exerting mechanism, and said pressure responsive element all within said duct.

5. A filter assembly for use with a regulator device, said filter assembly comprising:

a housing defining an internal passageway having a gas inlet opening near an upstream end of said housing, and a gas outlet opening spaced from said gas inlet opening, said housing having a first attachment portion configured for connection of an upstream end of said filter assembly to a pressurized source of breathable gas and a second attachment portion configured for connection of a downstream end of said filter assembly to said regulator device;

a retractable filter cover disposed within said passageway, said filter cover having a range of motion between (i) a closed position in which said filter cover blocks said gas inlet opening and prevents fluid flow therethrough and (ii) an open position in which said filter cover permits fluid flow through said gas inlet opening, said filter cover being biased toward said closed position, said filter cover intercepting a plane defined by an upstream end of said first attachment portion when in said closed position; and a filter disposed in said passageway downstream of said filter cover.

6. The filter assembly of claim 5, wherein said filter cover comprises a fluid stop member having an upper end portion adapted for engagement with said inlet opening when said filter cover is in said closed position.

7. The filter assembly of claim 6, wherein said fluid stop member includes at least one fluid channeling element for directing fluid into said passageway from said inlet opening when said fluid stop member is disengaged from said inlet opening.

8. The filter assembly of claim 6, wherein said fluid stop member comprises a piston element having a lower end portion opposite said upper end portion, said lower end portion being adapted for operative engagement with a bias force exerting mechanism disposed within said passageway.

9. The filter assembly of claim 8, wherein said piston element includes an outer peripheral surface between said upper and lower end portions, and at least one fluid channeling element associated with said piston element for directing fluid into said passageway from said inlet opening when said piston element is disengaged from said inlet opening.

10. The filter assembly of claim 9, wherein said fluid channeling element comprises an elongated groove disposed along said outer peripheral surface of said piston element.

11. The filter assembly of claim 6, wherein said fluid stop member comprises an orb having a width dimension less than the width dimension of said passageway and greater than the width dimension of said inlet opening.

12. The filter assembly of claim 5, further comprising a bias exerting mechanism disposed in said passageway and in operative engagement with said filter cover.

13. The filter assembly of claim 12, wherein said bias exerting mechanism comprises a resilient member.

14. The filter assembly of claim 12, wherein said bias exerting mechanism comprises a coil spring and a spring containment sleeve, said coil spring having one end portion engaged with said pressure responsive element and an opposite end portion mounted in said containment sleeve.

15. The filter assembly of claim 5, further comprising a retainer device disposed within said passageway and configured to removably secure said filter within said passageway.

16. The filter assembly of claim 12, further comprising a retainer device disposed within said passageway and configured to removably secure said filter within said passageway;
    wherein said filter is disposed between said bias exerting mechanism and said retainer device proximate said outlet opening.

17. The filter assembly of claim 5, wherein at least a portion of said filter cover extends upstream of said upstream end of said first attachment portion when said filter cover is in said closed position.

18. An inlet valve for a gas pressure regulator to couple the regulator to a high-pressure gas source, said valve comprising:
    a housing defining an axial duct with gas inlet and gas outlet openings defined at opposite ends of said duct, said housing having a first attachment portion disposed adjacent said gas inlet opening and adapted for engagement with said high-pressure gas source and a second attachment portion opposite said first attachment portion and adapted for engagement with said regulator;
    a retractable member mounted within said duct proximate said gas inlet opening and configured for movement between a first position for sealing said duct to prevent gas from entering said gas inlet opening, and a second position for permitting gas to enter said gas inlet opening and pass through said duct;
    a mechanism disposed in said duct for exerting a preselected bias force against said retractable member; and
    a gas filter element disposed in said duct downstream from said retractable member;
    wherein said gas inlet opening is located at an upstream end of said housing and said retractable member fills said gas inlet opening when in said first position.

19. The valve of claim 18, wherein said pressure regulator is a first stage regulator adapted to selectively engage a gas outlet portion of a container filled with pressurized breathable gas for use in a SCUBA system, said valve housing attachment portion comprising a collar surrounding said gas inlet opening.

20. The valve of claim 19, wherein said valve housing attachment portion further comprises a yoke fixture adapted for compressing said collar and valve housing gas inlet opening against the gas outlet portion of the pressurized breathable gas container.

21. The valve of claim 18, wherein said pressure regulator is a first stage regulator adapted to selectively engage a gas outlet portion of a container filled with pressurized breathable gas for use in a SCUBA system, said valve housing attachment portion comprising a DIN connector extending outwardly from said gas inlet opening, and a threaded connection knob for removably engaging said DIN connector and valve housing gas inlet opening with the gas outlet portion of the pressurized breathable gas container.

22. The valve of claim 18, wherein said retractable member comprises a piston element having a head portion with an upper outer surface adapted for engagement with said gas inlet opening when in said first position, a peripheral outer surface, and a lower end portion adapted for operative engagement with said bias force exertion mechanism, said piston element including at least one gas channeling element for directing gas into said duct from said gas inlet opening when said piston head portion is disengaged from said gas inlet opening.

23. The valve of claim 22, wherein said gas channeling element comprises an elongated groove disposed along the length of said peripheral outer surface of said piston element.

24. The valve of claim 18, wherein at least a portion of said retractable member extends upstream of said gas inlet opening when said retractable member is in said first position.

25. The valve of claim 18, wherein said retractable member comprises a spherical member having a diameter less than the width dimension of said duct and greater than the width dimension of said gas inlet opening.

26. The valve of claim 18, wherein said bias force exertion mechanism comprises a coil spring and a spring containment sleeve, said coil spring having one end portion engaged with said retractable member and the opposite end portion mounted in said containment sleeve.

27. In a regulator system for use in an underwater breathing apparatus having a high-pressure breathable gas source, said regulator system having a first stage regulator adapted for coupling to the high-pressure breathable gas source for reducing the pressure thereof to an intermediate pressure level, a mechanism for releasably attaching the first stage regulator to the high-pressure breathable gas source, and a second stage regulator adapted for further reducing the pressure of the breathable gas from the intermediate pressure level to a readily breathable pressure level useable by an underwater diver, the improvement wherein the mechanism for releasably attaching said first stage regulator to the high-pressure breathable gas source comprises:
    a valve housing defining a central passageway having a gas inlet opening and a gas outlet opening, said housing further including an attachment portion disposed at said gas inlet opening and configured for attachment to said high-pressure breathable gas source;
    a retractable member positioned for movement within said passageway between a first position to close said inlet opening and seal it from the entry of gas and other fluids, and a second position permitting flow of gas into said inlet opening and through said passageway to said first stage regulator;
    a device for exerting a bias force against said retractable member to urge it toward said first position absent sufficient pressure upon said retractable member to move said retractable member toward said second position; and
    a retaining device for removably securing said retractable member and said bias exerting device within said passageway;
    wherein said retractable member intercepts a plane defined by an upstream end of said attachment portion when said retractable member is in said first position.

28. The improvement of claim 27, wherein said valve housing is an integral part of said first stage regulator.

29. The improvement of claim 27, wherein said valve housing further includes a threaded post portion disposed at said gas outlet opening and adapted for removable engagement with said first stage regulator.

30. The improvement of claim 27, wherein a gas filter member is disposed within said passageway of said valve housing.

31. The improvement of claim 30, wherein said gas filter member is conical in shape and disposed between said retractable member and said gas outlet opening.

32. The improvement of claim 30, wherein said gas filter member is in the form of a substantially flat cylinder and disposed between said retractable member and said gas outlet opening.

33. The improvement of claim 27, wherein at least a portion of said retractable member extends upstream of said attachment portion when in said first position.

34. The improvement of claim 27, wherein said retractable member comprises a piston element having a head portion with a curved upper outer surface adapted for engagement with said gas inlet opening when in said first position, a peripheral outer surface, and a lower end portion adapted for operative engagement with said bias force exerting device, said piston element including at least one elongated groove disposed longitudinally along the length of said peripheral outer surface for channeling gas into said passageway from said gas inlet opening when said piston head portion is disengaged from said gas inlet opening.

35. The improvement of claim 34, wherein said piston element includes a plurality of said grooves equally spaced about said peripheral outer surface.

36. The improvement of claim 35, wherein said bias force exerting device comprises a coil spring and a spring containment sleeve, said coil spring having one end portion engaged with said retractable member and an opposite end portion mounted in said containment sleeve, the bias force of said coil spring being sufficient to counteract a pressure upon said retractable member of approximately 10 psi.

37. In a regulator device for reducing the gas pressure of a high-pressure breathable gas source in a self-contained underwater breathing apparatus to a useable level when delivered to an underwater diver using said apparatus, the regulator device including a regulator housing, a gas inlet mechanism including a gas inlet valve for the regulator housing, pressure-sensing means for reducing gas pressure within the regulator housing at variable water depths, and an outlet mechanism for delivering breathable gas at a pressure level less than the pressure level of said gas at the gas inlet mechanism, the improvement wherein said gas inlet valve comprises:

a valve housing defining a tubular interior duct having gas inlet and gas outlet apertures at opposite ends thereof;

a gas flow control element positioned within said duct for movement between a first position to seal said gas inlet aperture to prevent entrance of gas and any other fluid into said duct, and a second position to open said gas inlet aperture to the flow of pressurized gas therethrough into said duct, said control element moving in a reciprocal manner within said tubular duct between said first and second positions;

a resilient member mounted in said duct in operative relation with said gas flow control element to create a bias force to regulate the movement of said gas flow control element between said first and second positions, the bias force created by said resilient member maintaining said gas flow control element at said first position absent sufficient pressure upon said gas flow control element to overcome the bias force of said resilient member; and a retainer member for removably securing said gas flow control element and said resilient member within said tubular duct;

wherein said gas inlet aperture is located at an upstream end of said housing and said gas flow control element fills said gas inlet aperture when in said first position.

38. The improvement of claim 37, wherein said regulator device comprises a first stage regulator with said high-pressure breathable gas source comprising a SCUBA tank having a tank gas outlet member, and wherein said gas inlet valve housing further comprises an attachment portion in the form of a collar surrounding said gas inlet aperture for selective attachment to said tank gas outlet member, and a threaded post portion disposed at said valve housing gas outlet aperture for engagement with said first stage regulator.

39. The improvement of claim 37, wherein said gas inlet valve further comprises a gas filter member disposed within said duct.

40. The improvement of claim 39, wherein said gas filter member is conical in shape and is disposed between said gas flow control element and said gas outlet aperture.

41. The improvement of claim 39, wherein said gas filter member is in the form of a substantially flat cylinder and is disposed between said gas flow control element and said gas outlet aperture.

42. The improvement of claim 37, wherein said gas flow control element comprises a piston having a head portion with a curved upper outer surface adapted for retractable engagement with said gas inlet aperture, a cylindrical outer surface, and a lower end portion adapted for operative engagement with said resilient member, said piston including at least one elongated groove disposed longitudinally along the length of said cylindrical outer surface for channeling gas into said duct from said gas inlet aperture when said piston head portion is disengaged from said gas inlet aperture.

43. The improvement of claim 42, wherein said piston includes a plurality of grooves equally spaced about said cylindrical outer surface.

44. The improvement of claim 43, wherein said resilient member comprises a coil spring disposed in a spring containment sleeve, said coil spring having one end portion engaged with said piston lower end portion and the opposite end portion mounted in said containment sleeve, the selective bias force of said coil spring being sufficient to overcome a pressure on said gas flow control element of approximately 10 psi.

45. The improvement of claim 42, wherein said piston comprises a spherical element having a diameter less than a diameter of said duct and greater than the diameter of said gas inlet aperture, and wherein said resilient member comprises a coil spring disposed in a spring containment sleeve, said coil spring having one end portion engaged with said spherical element and the opposite end portion mounted in said containment sleeve.

46. The improvement of claim 37, wherein said regulator device is a first stage regulator adapted to selectively engage a gas outlet portion of a container filled with pressurized breathable gas for use in a SCUBA system, said valve housing having an attachment portion comprising a collar surrounding said gas inlet aperture.

47. The improvement of claim 46, wherein said attachment portion further comprises a yoke fixture adapted for compressing said collar and valve housing gas inlet aperture against the gas outlet portion of the pressurized breathable gas container.

48. The improvement of claim 37, wherein said regulator device is a first stage regulator adapted to selectively engage a gas outlet portion of a container filled with pressurized breathable gas for use in a SCUBA system, said valve housing including an attachment portion comprising a DIN connector extending outwardly from said gas inlet aperture, and a threaded connection knob for removably engaging said DIN connector and valve housing gas inlet aperture with the gas outlet portion of the pressurized breathable gas container.

* * * * *